US012296577B2

(12) United States Patent
Tamura et al.

(10) Patent No.: US 12,296,577 B2
(45) Date of Patent: May 13, 2025

(54) IMAGE RECORDING APPARATUS

(71) Applicant: BROTHER KOGYO KABUSHIKI KAISHA, Nagoya (JP)

(72) Inventors: Hikaru Tamura, Okazaki (JP); Nao Morimoto, Nagoya (JP); Yuya Tatematsu, Nagoya (JP); Kengo Noda, Inazawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 87 days.

(21) Appl. No.: 18/173,834

(22) Filed: Feb. 24, 2023

(65) Prior Publication Data

US 2023/0271432 A1 Aug. 31, 2023

(30) Foreign Application Priority Data

Feb. 25, 2022 (JP) ................................ 2022-028450

(51) Int. Cl.

| | |
|---|---|
| ***B41J 11/00*** | (2006.01) |
| ***B41J 11/58*** | (2006.01) |
| ***B41J 13/10*** | (2006.01) |
| ***B65H 1/26*** | (2006.01) |
| ***B65H 3/56*** | (2006.01) |

(52) U.S. Cl.

CPC ............ *B41J 11/0045* (2013.01); *B41J 11/58* (2013.01); *B41J 13/103* (2013.01); *B65H 1/266* (2013.01); *B65H 3/56* (2013.01); *B65H 3/565* (2013.01); *B65H 2402/46* (2013.01); *B65H 2405/113* (2013.01); *B65H 2405/1132* (2013.01);

(Continued)

(58) Field of Classification Search

CPC ...... B41J 11/0045; B41J 11/58; B41J 13/103; B65H 1/266; B65H 3/56; B65H 3/565; B65H 2402/46; B65H 2405/113; B65H 2405/1132; B65H 2405/1136; B65H 2405/31; B65H 2801/06

See application file for complete search history.

(56) References Cited

U.S. PATENT DOCUMENTS

2010/0308528 A1* 12/2010 Chung ................ B65H 3/0684 271/117

2015/0084269 A1 3/2015 Tateishi et al.

(Continued)

FOREIGN PATENT DOCUMENTS

| | | | |
|---|---|---|---|
| JP | 2015-86071 | A | 5/2015 |
| JP | 2018-2315 | A | 1/2018 |
| WO | 2015/087517 | A1 | 6/2016 |

*Primary Examiner* — Henok D Legesse

(74) *Attorney, Agent, or Firm* — Merchant & Gould P.C.

(57) ABSTRACT

An image recording apparatus includes a housing in which a conveyance path is formed, a feed tray insertable into and removable from the housing, configured to accommodate sheet media, and including a first accommodating portion, an image recording portion, a guide member configured to guide one of the sheet media, a stopper movable between a restriction state in which the stopper abuts against a leading end of the sheet medium to prevent the sheet medium from reaching a bank provided and a retraction state in which the stopper is separated from the leading end to allow the sheet medium to reach the guide member, when the feed tray is inserted into the housing, and a flap provided above the sheet media and movable in an up-down direction by pivoting about a given rotation axis.

12 Claims, 17 Drawing Sheets

(52) U.S. Cl.
CPC .. *B65H 2405/1136* (2013.01); *B65H 2405/31* (2013.01); *B65H 2801/06* (2013.01)

(56) References Cited

U.S. PATENT DOCUMENTS

| | | | | |
|---|---|---|---|---|
| 2016/0257511 | A1* | 9/2016 | Machida ................ | B65H 5/062 |
| 2021/0237991 | A1* | 8/2021 | Miyake .................... | B65H 5/06 |

* cited by examiner

IMAGE RECORDING APPARATUS

REFERENCE TO RELATED APPLICATIONS

This application claims priority from Japanese Patent Application No. 2022-028450 filed on Feb. 25, 2022. The entire content of the priority application is incorporated herein by reference.

BACKGROUND ART

In related art, a feed tray including an accommodating portion in which sheet media are vertically stacked is inserted into a housing, and an image is recorded on the sheet medium fed from the feed tray. In the related art, a stopper abuts against a leading end of the sheet medium to restrict movement of the sheet medium when the feed tray is inserted into the housing. The movement of the sheet medium is restricted by the stopper abutting against the leading end.

DESCRIPTION

For example, when the feed tray is inserted into the housing of an image recording apparatus vigorously, the sheet medium in the accommodating portion may abut against the stopper due to an inertial force acting toward a back side along an insertion direction, and then may run up an inclined surface of the stopper.

In order to address this problem, in the related art described above, a key-shaped hammer-shaped portion is provided at an upper end portion of the stopper, and the movement of the sheet medium running up as described above is prevented and stopped. However, when the sheet medium is stopped in this manner, the sheet medium may jump up or flutter to a side opposite to the stopper, that is, a front side along the insertion direction of the feed tray or an upper side. In this case, since the sheet medium may be stopped in the middle of the inclined surface of the stopper or a plurality of sheet media stop in an overlapped state, it is necessary to consider how to prevent these phenomena from adversely affecting subsequent feeding.

An object of the present disclosure is to provide an image recording apparatus capable of stopping an internal sheet medium in a stable state and preventing an adverse effect on feeding even when a feed tray is inserted into a housing at a high speed.

In order to achieve the above object, the present disclosure includes: a housing in which a conveyance path is formed; a feed tray insertable into and removable from the housing, configured to accommodate sheet media, and including a first accommodating portion configured to accommodate the sheet media in a vertically stacked state, each of the sheet media being in a substantially horizontal posture; an image recording portion configured to record an image on one of the sheet media in the conveyance path; a guide member provided at a portion in the housing which faces an end portion of the feed tray inserted into the housing at a back side along an insertion direction, and configured to guide one of the sheet media in the first accommodating portion to the conveyance path; a stopper movable between a restriction state in which the stopper abuts against a leading end of the sheet medium in the first accommodating portion to prevent the sheet medium from reaching a bank provided in the guide member and a retraction state in which the stopper is separated from the leading end of the sheet medium to allow the sheet medium to reach the guide member when the feed tray is inserted into the housing; and a flap provided above the sheet media stacked in the first accommodating portion and on a side opposite to the stopper with the stacked sheet media interposed therebetween, and movable in an up-down direction by pivoting about a given rotation axis.

In the present disclosure, the plurality of sheet media are stacked in the first accommodating portion of the feed tray inserted into the housing. The sheet medium in the first accommodating portion is guided to the conveyance path by the guide member, and a desired image is recorded by the image recording portion on the conveyance path.

The image recording apparatus according to the present disclosure is provided with the stopper that is movable between the restriction state and the retraction state. When the feed tray is inserted into the housing, the stopper in the restriction state abuts against the leading end of the sheet medium, thereby preventing the sheet medium from reaching the guide member.

The image recording apparatus according to the present disclosure further includes a flap. The flap is movable in the up-down direction by pivoting about the given rotation axis, is located above the sheet media stacked in the first accommodating portion, and is provided on a side opposite to the stopper with the stacked sheet media interposed therebetween. For example, even when the feed tray is inserted vigorously and the sheet medium runs up an inclined surface and flutters, the flap is provided on the side opposite to the stopper with the sheet medium interposed therebetween, and the sheet medium may be restrained by both the stopper and the flap, and thus the sheet medium may be stopped in a stable state.

Since the sheet medium is stopped in the stable state by the stopper and the flap, it is possible to prevent an adverse effect on subsequent feeding.

An image recording apparatus 1 according to an embodiment of the present disclosure will be described with reference to the drawings. In the following description, directions such as up and down, front and rear, left and right, and the like correspond to directions of arrows appropriately shown in each figure such as FIG. 1.

<Overall Configuration of Image Recording Apparatus>

Figure 1:
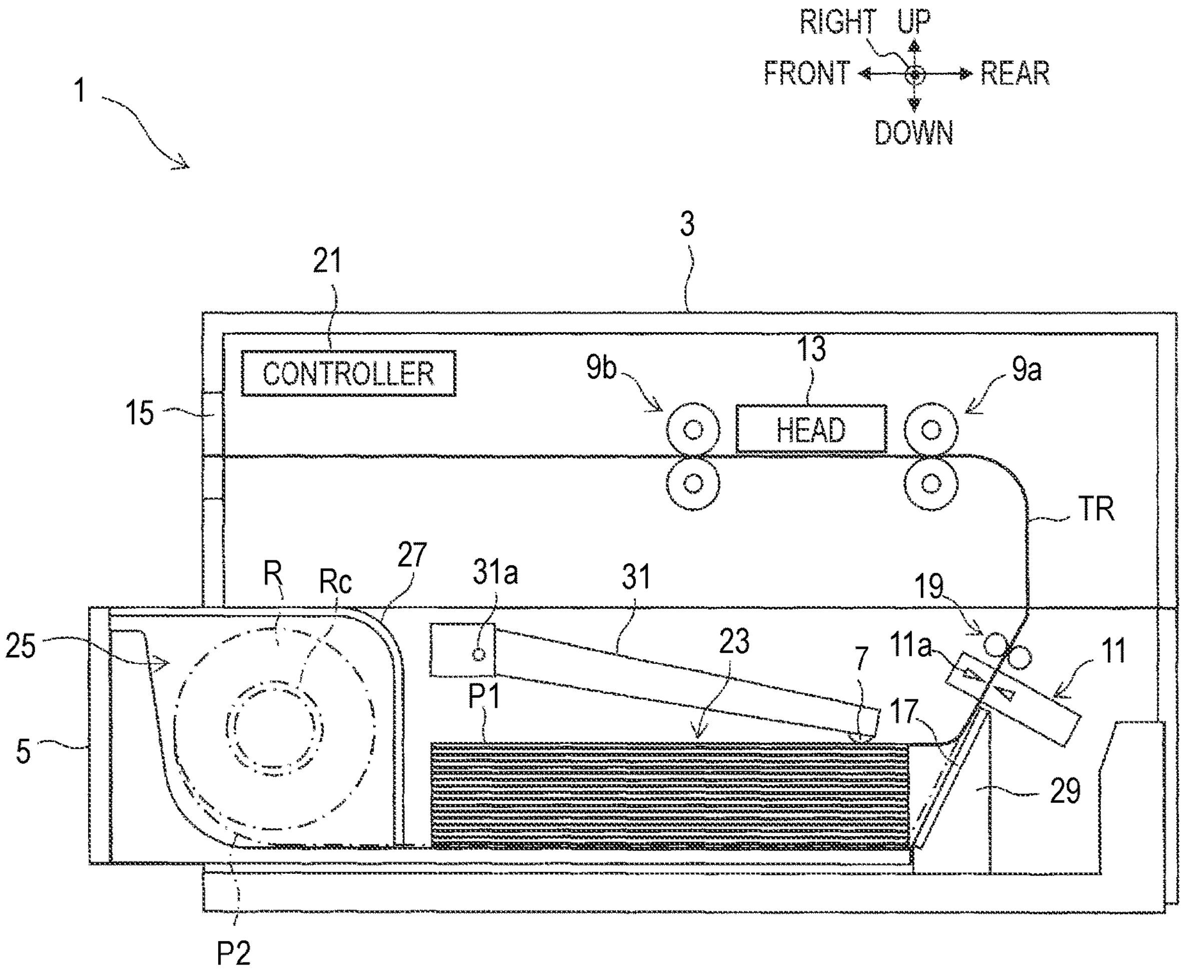
FIG. 1 is a schematic diagram schematically illustrating an overall cross-sectional configuration of an image recording apparatus according to an embodiment of the present disclosure.

FIG. 1 schematically shows an overall cross-sectional configuration of the image recording apparatus 1 according to an embodiment of the present disclosure. As illustrated in FIG. 1, the image recording apparatus 1 includes a housing 3, a feed tray 5, feed rollers 7, conveyance rollers 9*a*, discharge rollers 9*b*, a cutter mechanism 11, a head 13, a sheet discharging tray 15, a guide member 17, intermediate rollers 19, and a controller 21.

The feed tray 5 is insertable into and removable from a lower portion of the housing 3 in a front-rear direction. In the present embodiment, an insertion direction of the feed tray 5 is a rearward direction, and a pull-out direction is a forward direction. The sheet discharging tray 15 constitutes a front side wall of an upper portion of the housing 3, and is openable and closable with respect to the housing 3. The feed tray 5 includes a first accommodating portion 23 and a second accommodating portion 25. The first accommodating portion 23 accommodates a plurality of cut sheets P1 (an example of a sheet medium), each of which is in a substantially horizontal posture, in a vertically stacked state. A maximum accommodating number of the cut sheets P1 is, for example, 500 sheets. The second accommodating portion 25 accommodates a roll body R in which a long roll sheet P2 (an example of the sheet medium or a roll medium) is wound in a roll shape around an outer peripheral surface of a cylindrical core member Rc. The second accommodating portion 25 includes a roll cover 27 that covers the accommodated roll body R.

A guide wall portion 29 protruding upward is formed on a rear side of the feed tray 5 in the housing 3. The guide wall portion 29 is a portion of the housing 3 which faces an end portion at a back side along the insertion direction of the feed tray 5 inserted into the housing 3, that is, a rear end portion of the feed tray 5. The guide member 17 guides the cut sheets P1 in the first accommodating portion 23 to a conveyance path TR. The guide member 17 is provided at a front side of the guide wall portion 29.

The cut sheet P1 accommodated in the first accommodating portion 23 is fed toward the conveyance path TR by the feed rollers 7, and is sent to the sheet discharging tray 15 via the intermediate rollers 19, the conveyance rollers 9*a*, the head 13, and the discharge rollers 9*b*. The conveyance path TR of the cut sheet P1 is defined by the feed rollers 7, the intermediate rollers 19, the conveyance rollers 9*a*, and the discharge rollers 9*b*. The roll sheet P2 unwound from the roll body R accommodated in the second accommodating portion 25 is fed toward the conveyance path TR by the feed rollers 7, and is sent to the sheet discharging tray 15 via the intermediate rollers 19, the conveyance rollers 9*a*, the head 13, and the discharge rollers 9*b*. The conveyance path TR of the roll sheet P2 is defined by the feed rollers 7, the intermediate rollers 19, the conveyance rollers 9*a*, and the discharge rollers 9*b*. The conveyance path TR for the cut sheet P1 and the roll sheet P2 is formed inside the housing 3.

In the image recording apparatus 1, when printing the cut sheet P1, the roll sheet P2 is not unwound from the roll body R accommodated in the second accommodating portion 25, or the roll body R is not accommodated in the second accommodating portion 25. When printing the roll sheet P2, the cut sheet P1 is not accommodated in the first accommodating portion 23. When the feed tray 5 is inserted into the housing 3, the entire first accommodating portion 23 and at least a part of the second accommodating portion 25 are accommodated in the housing 3.

The feed roller 7 is disposed in the vicinity of a rear end portion of the first accommodating portion 23. The feed roller 7 is rotated by driving of a feed motor (not shown) to feed the cut sheet P1 and the roll sheet P2 from the feed tray 5 along the common conveyance path TR.

The image recording apparatus 1 includes a swing arm 31. The swing arm 31 rotatably supports the feed roller 7 at a rear end portion thereof, and includes a swing shaft member 31*a* (an example of a swing shaft) at a front end portion thereof. A rotation axis direction of the swing shaft member 31*a* is substantially parallel to a left-right direction. The feed roller 7 and the swing arm 31 are moved by a retracting mechanism (not shown) to a position where the feed roller 7 and the swing arm 31 do not interfere with the feed tray 5 when the feed tray 5 is inserted into or removed from the housing 3.

The cutter mechanism 11 (an example of a cutting portion) is disposed downstream of the feed roller 7 in a conveyance direction of the cut sheet P1 and the roll sheet P2 along the conveyance path TR, and upstream of the head 13 in the conveyance direction. The cutter mechanism 11 includes a cutter 11*a* and a cutting motor 11*b* (see FIGS. 2 and 3 to be described later) that reciprocates the cutter 11*a* in the left-right direction. The roll sheet P2 unwound from the roll body R and conveyed along the conveyance path TR is cut by the cutter 11*a* as the cutting motor 11*b* is driven under control of the controller 21.

The intermediate rollers 19 are provided downstream of the cutter mechanism 11 in the conveyance direction and upstream of the head 13 in the conveyance direction. The intermediate rollers 19 convey the cut sheet P1 and the roll sheet P2 to the conveyance rollers 9*a*. The intermediate roller 19 includes a driving roller that is rotated by driving of an intermediate motor (not shown), and a driven roller that is rotated by the driving roller.

The conveyance roller 9*a* includes a driving roller that is rotated by driving of a conveyance motor (not shown), and a driven roller that is rotated by a driving roller. The discharge roller 9*b* includes a driving roller that is rotated by driving of a discharge motor (not shown), and a driven roller that is rotated by the driving roller. The conveyance motor and the discharge motor are driven under the control of the controller 21, and the conveyance rollers 9*a* and the discharge rollers 9*b* rotate while nipping the cut sheet P1 or the roll sheet P2, whereby the cut sheet P1 or the roll sheet P2 is conveyed.

The head 13 (an example of an image recording portion) records an image on the cut sheet P1 or the roll sheet P2. The head 13 is disposed downstream of the conveyance rollers 9*a* in the conveyance direction and upstream of the discharge rollers 9*b* in the conveyance direction. The head 13 ejects an ink from a nozzle under the control of the controller 21. When the cut sheet P1 or the roll sheet P2 conveyed by the conveyance rollers 9*a* passes through a position facing a lower surface of the head 13, the ink is ejected from the nozzle of the head 13, and the image is recorded on the cut sheet P1 or the roll sheet P2. The cut sheet P1 or the roll sheet P2 on which the image is recorded by the head 13 is conveyed to the sheet discharging tray 15 in an open state with respect to the housing 3.

The controller 21 controls the feed motor, the intermediate motor, the conveyance motor, the discharge motor, the head 13, the cutting motor 11*b*, and the like. The controller 21 includes, for example, a CPU, a ROM, and a RAM. The ROM stores programs and data for the CPU to perform various control. The RAM temporarily stores data used when the CPU executes the program.

<Configuration Near Flap>

Figure 2:
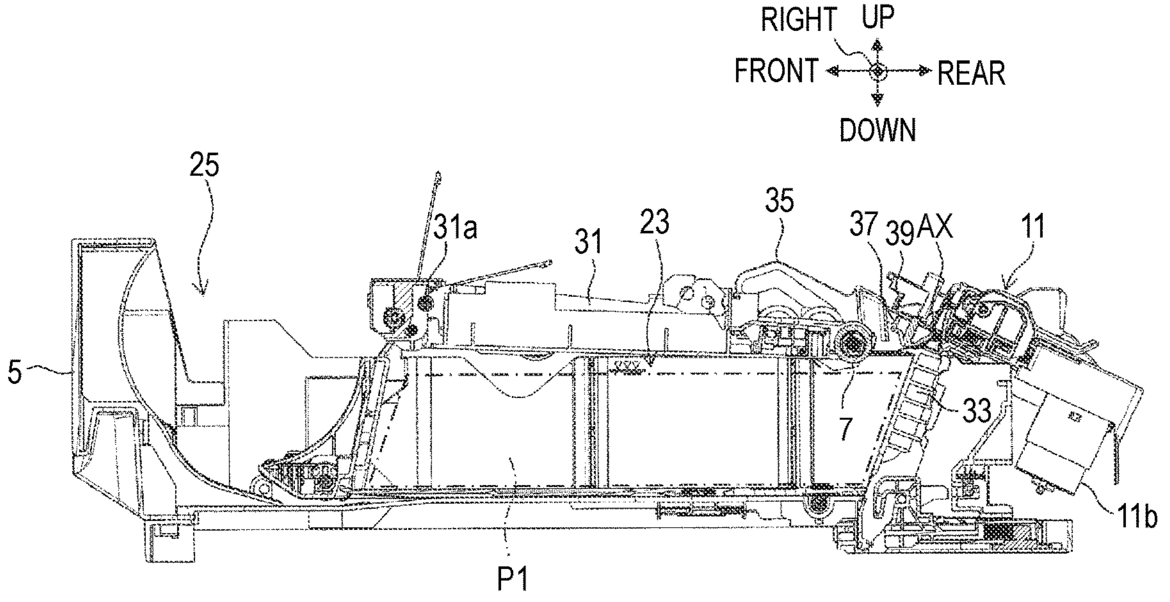
FIG. 2 is a cross-sectional view illustrating a cross-sectional configuration near a stopper and a flap in the image recording apparatus in a fully loaded state, and a cross-sectional configuration of a feed tray.
Figure 3:
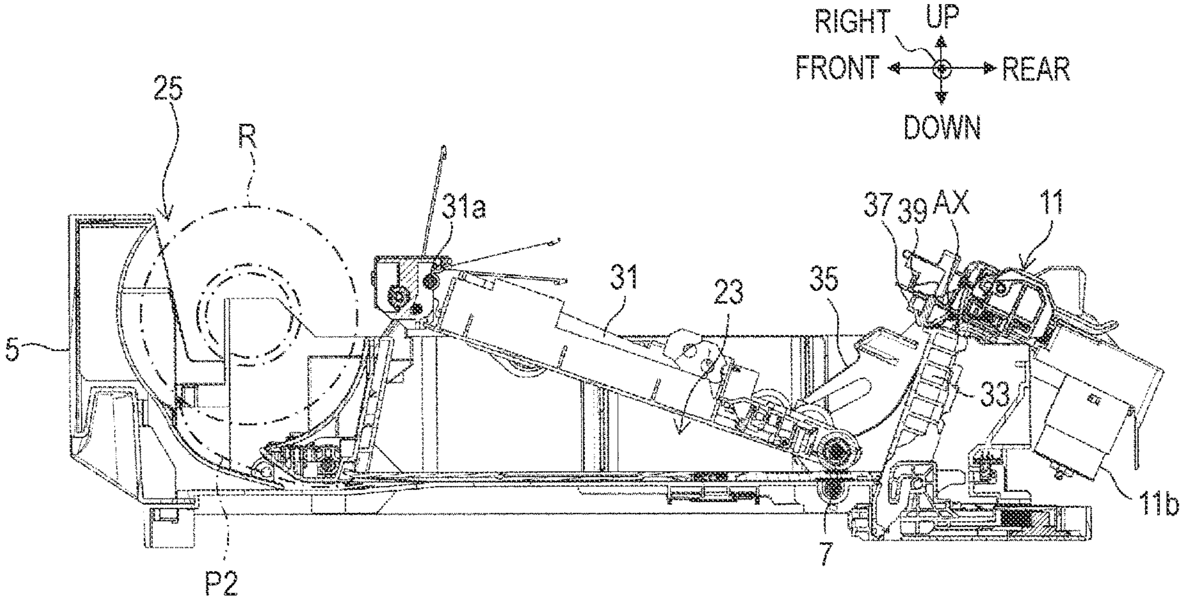
FIG. 3 is a cross-sectional view illustrating the cross-sectional configuration near the stopper and the flap in the image recording apparatus in a load-free state, and the cross-sectional configuration of the feed tray.

FIGS. 2 and 3 illustrate a cross-sectional configuration near a stopper 33 and a flap 35 and a cross-sectional configuration of the feed tray 5 in the image recording apparatus 1. FIG. 2 illustrates a state (fully loaded state) in which a large amount of cut sheets P1 are accommodated in the first accommodating portion 23 of the feed tray 5, and FIG. 3 illustrates a state in which a small amount of cut sheets P1 are accommodated in the first accommodating portion 23 of the feed tray 5 or a state (load-free state) in which the cut sheets P1 are not accommodated in the first accommodating portion 23 and the roll body R is accommodated in the second accommodating portion 25.

As shown in FIGS. 2 and 3, the image recording apparatus 1 includes the stopper 33 and the flap 35. The stopper 33 stands at an intermediate position in the left-right direction of the housing 3 behind the feed tray 5 inserted into the housing 3. The stopper 33 is inclined with respect to the up-down direction so as to be located rearward toward an upper side. When the feed tray 5 is inserted into the housing 3, the stopper 33 is movable between a restriction state in which the stopper 33 abuts against a leading end of the cut sheet P1 in the first accommodating portion 23 to prevent the cut sheet P1 from reaching a bank 17B and a retraction state in which the stopper 33 is separated from the leading end of the cut sheet P1 to allow the cut sheet P1 to reach the guide member 17. In the restriction state, the stopper 33 protrudes forward from convex portions of a plurality of minute concavo-convex portions 17B1 formed in the bank 17B (see FIG. 10 to be described later). In the retraction state, the stopper 33 is retracted rearward from a guide surface of the guide member 17 (see FIG. 23 to be described later). FIGS. 2 and 3 show the stopper 33 in the restriction state. Details of the above-described operations of the stopper 33 will be described later.

As shown in FIG. 2, the flap 35 is provided above the cut sheet P1 stacked in the first accommodating portion 23 and on a side opposite to the stopper 33 with the stacked cut sheets P1 interposed therebetween. The flap 35 is a member that stops the cut sheet P1 in a stable state when the feed tray 5 is inserted into the housing 3. The flap 35 is movable in the up-down direction by pivoting about a rotation axis AX (see FIG. 4) located at a rear end. FIG. 2 shows a state in which the flap 35 is moved upward, and FIG. 3 shows a state in which the flap 35 is moved downward. As shown in FIG. 3, when the roll body R is used, since the unwound roll sheet P2 is curled, the roll sheet P2 is guided to the conveyance path TR by being sandwiched between the flap 35 and the guide member 17, and an occurrence of paper jam may be prevented.

Figure 4:
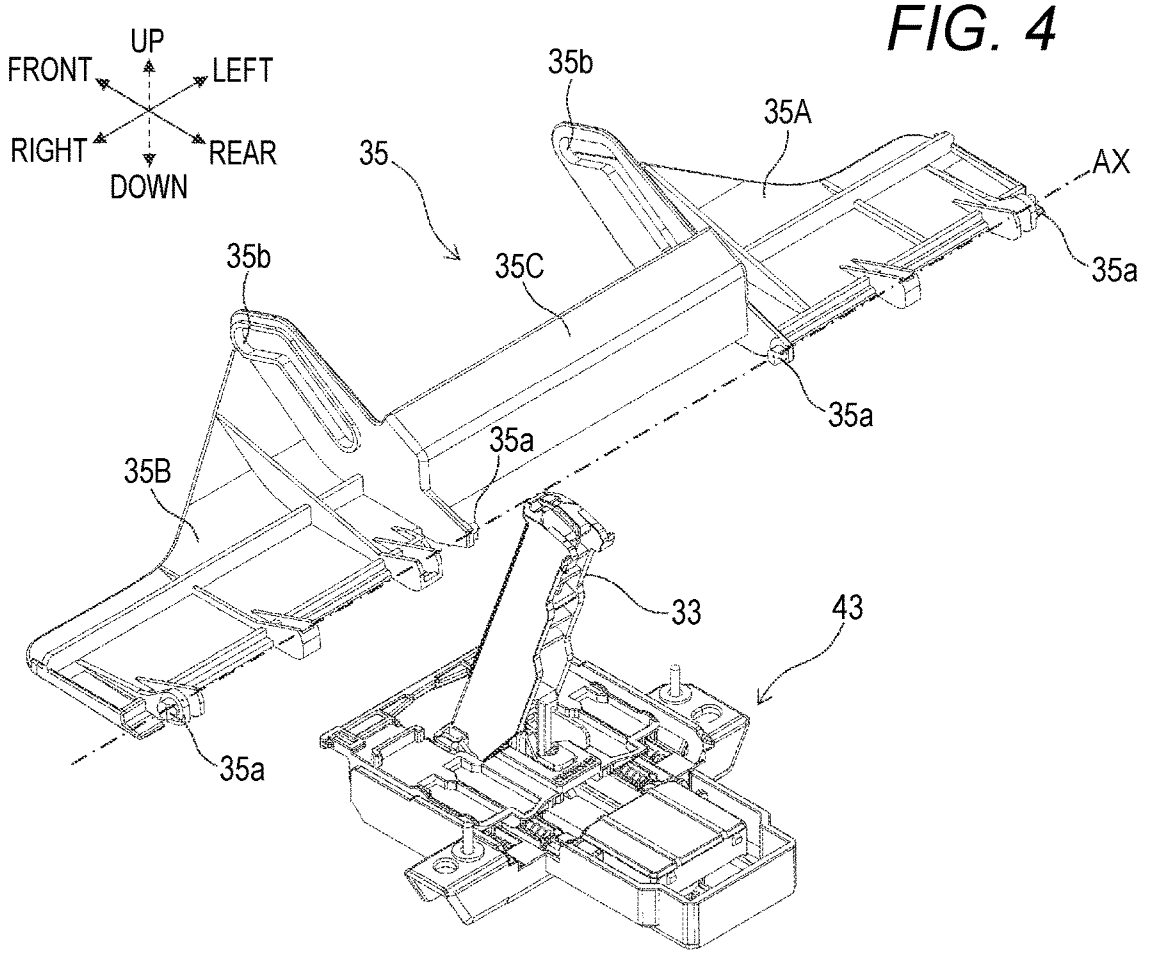
FIG. 4 is a perspective view illustrating an overall configuration of the flap and a positional relationship between the stopper and the flap.

FIG. 4 shows the overall configuration of the flap 35 and the positional relationship between the stopper 33 and the flap 35. FIG. 4 shows a positional relationship corresponding to the fully loaded state shown in FIG. 2. As illustrated in FIG. 4, the flap 35 includes a pair of curved plate members 35A and 35B that are disposed on both sides in the left-right direction and curved so as to bulge downward, and a connection member 35C that is disposed between the curved plate members 35A and 35B and connects the curved plate members 35A and 35B. Lower surfaces of the curved plate members 35A and 35B abuts against the cut sheet P1 or the roll sheet P2. At rear end portions of the curved plate members 35A and 35B, for example, two rotation shaft members 35*a* are formed on each of the curved plate members 35A and 35B, that is, a total of four rotation shaft members 35*a* are formed. The four rotation shaft members 35*a* (an example of a rotation shaft) are fitted into shaft holes 37*a* of a fixed chute 37 (see FIG. 7 to be described later), whereby the flap 35 is supported so as to be pivotable about the rotation axis AX. The rotation axis AX is substantially parallel to the left-right direction, and is located in the vicinity of an upper end of the stopper 33 in the restriction state.

On front sides of the curved plate members 35A and 35B, a pair of elongated holes 35*b* having a shape bent in the middle thereof are formed in a manner of facing each other in the left-right direction. Two convex portions 31*b* (see FIG. 13 to be described later) extending from the vicinity of a rear end portion of the swing arm 31 toward both sides in the left-right direction are engaged with the elongated holes 35*b*, respectively. By this engagement, the flap 35 pivots around the rotation axis AX as the swing arm 31 swings, and is moved in the up-down direction. The elongated holes 35*b* and the convex portions 31*b* constitute engagement mechanisms that engage the flap and the swing arm by concave-convex engagement structures, and move the flap up and down as the swing arm swings.

Figure 5:
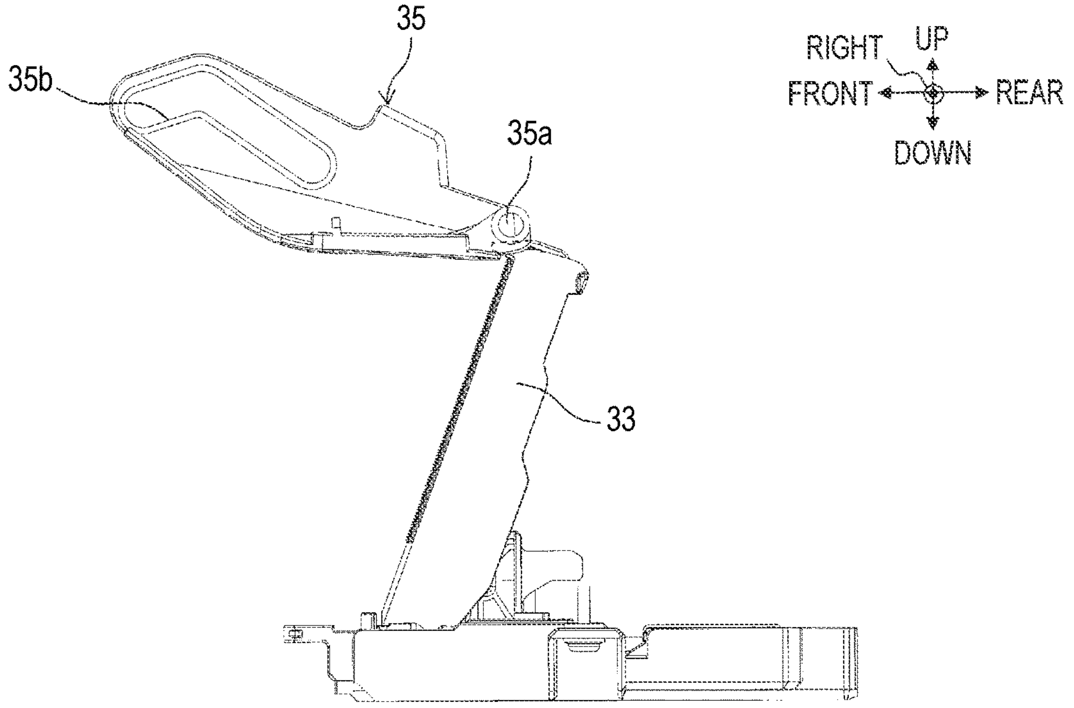
FIG. 5 is a side view illustrating the positional relationship between the flap and the stopper in the fully loaded state as viewed from a right direction.
Figure 6:
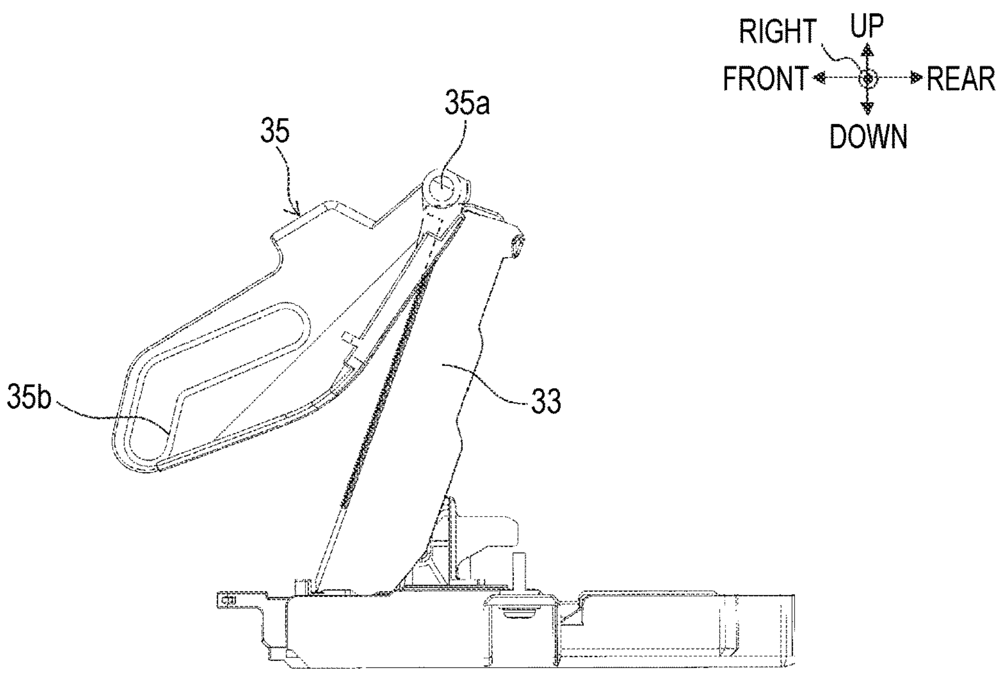
FIG. 6 is a side view illustrating the positional relationship between the flap and the stopper in the load-free state as viewed from the right direction.

FIGS. 5 and 6 show a positional relationship between the flap 35 and the stopper 33 in a side view seen from a right direction. FIG. 5 shows a positional relationship when the flap is in the fully loaded state as shown in FIG. 2. As shown in FIG. 5, when the flap 35 is moved upward and the stopper 33 is in the restriction state, a rear end portion of the flap 35 and an upper end portion of the stopper 33 overlap with each other in the side view seen from the right direction. FIG. 6 shows a positional relationship when the flap 35 is in the load-free state shown in FIG. 3. As shown in FIG. 6, when the flap 35 is moved downward and the stopper 33 is in the restriction state, the upper end portion of the flap 35 and the upper end portion of the stopper 33 overlap with each other in a wider range than in FIG. 5 in the side view seen from the right direction.

Figure 7:
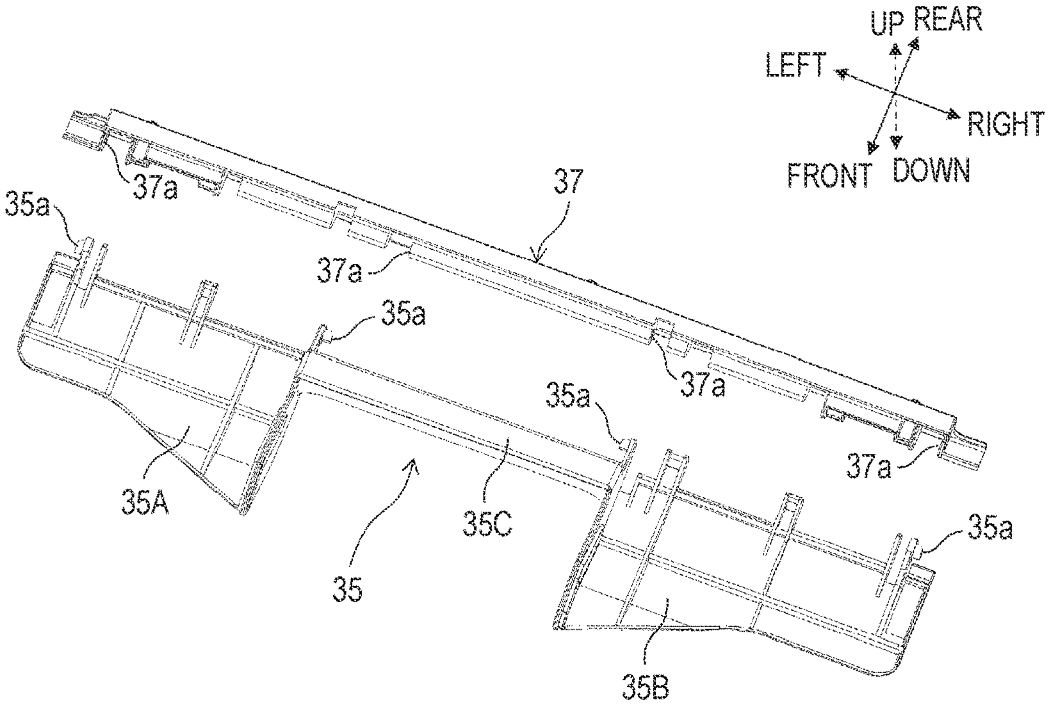
FIG. 7 is an exploded perspective view illustrating a support configuration of the flap.
Figure 8:
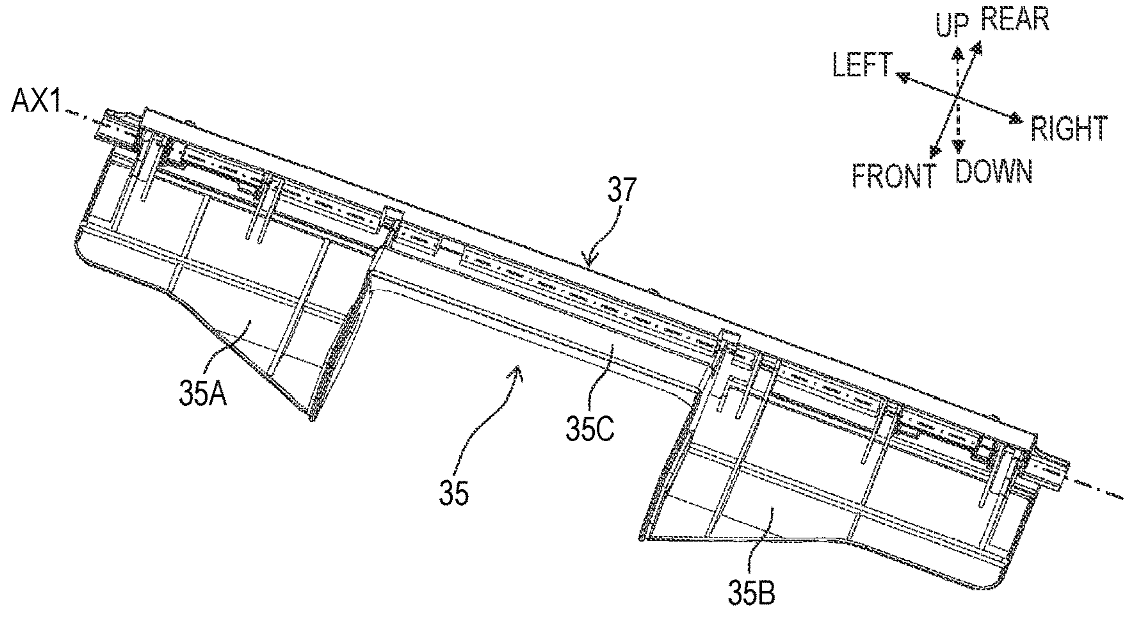
FIG. 8 is a perspective view illustrating the support configuration of the flap.

FIGS. 7 and 8 show a support configuration of the flap 35. The fixed chute 37 (an example of a fixed structure member or a chute member) guides the cut sheet P1 or the roll sheet P2 fed by the feed roller 7 to an entrance of the cutter mechanism 11. As illustrated in FIG. 7, the fixed chute 37 is a columnar member extending in the left-right direction. In the fixed chute 37, the shaft holes 37*a* are formed at four positions in the left-right direction to pivotably support the rotation shaft members 35*a* of the flap 35. The shaft holes 37*a* are formed at positions corresponding to the four rotation shaft members 35*a* of the flap 35. As shown in FIG. 8, the four rotation shaft members 35*a* of the flap 35 are respectively fitted into the four shaft holes 37*a* of the fixed chute 37, whereby the flap 35 is supported in a manner of being pivotable about the rotation axis AX.

Figure 9:
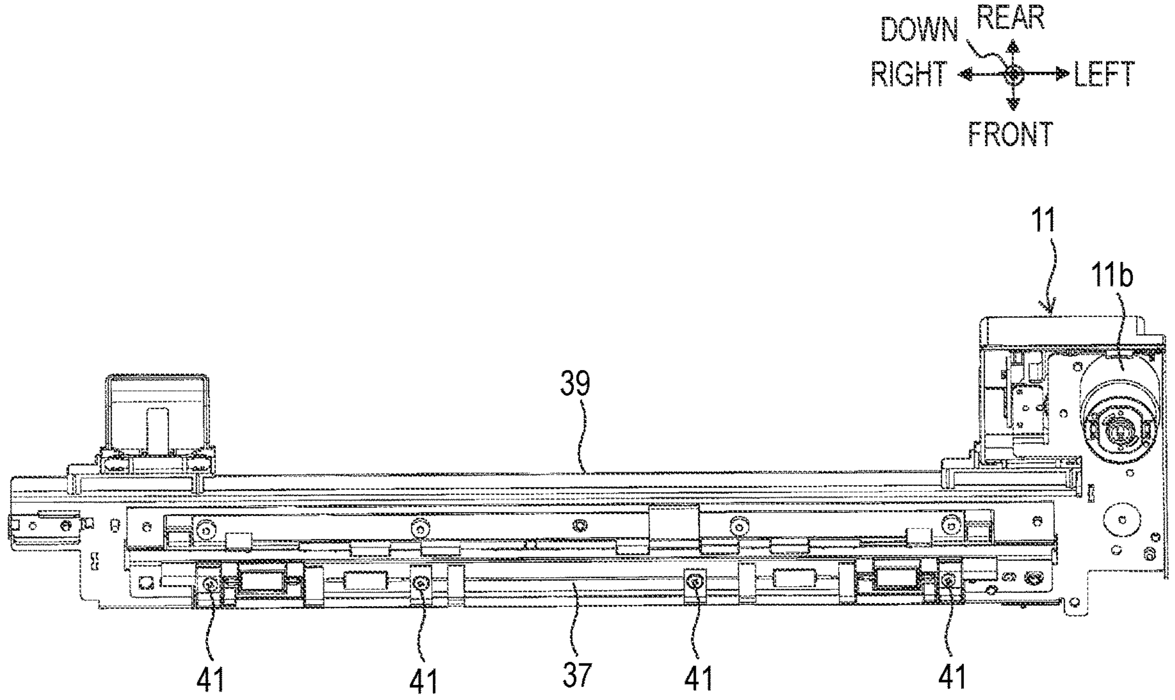
FIG. 9 is a bottom view illustrating a fixed structure of a fixed chute to a cutter frame.

FIG. 9 shows a fixed structure of the fixed chute 37. As shown in FIG. 9, the fixed chute 37 is fixed to a cutter frame 39 (an example of a frame) that supports the cutter mechanism 11. The cutter frame 39 is made of a highly rigid material such as a metal material. The fixed chute 37 is fixed to the cutter frame 39 by fastening screws 41 to the cutter frame 39 at, for example, four positions in the left-right direction. The flap 35 is pivotably supported by the fixed chute 37, and the fixed chute 37 is fixed to the cutter frame 39. The cutter frame 39 is fixed to the housing 3.

<Configuration Near Stopper>

Figure 10:
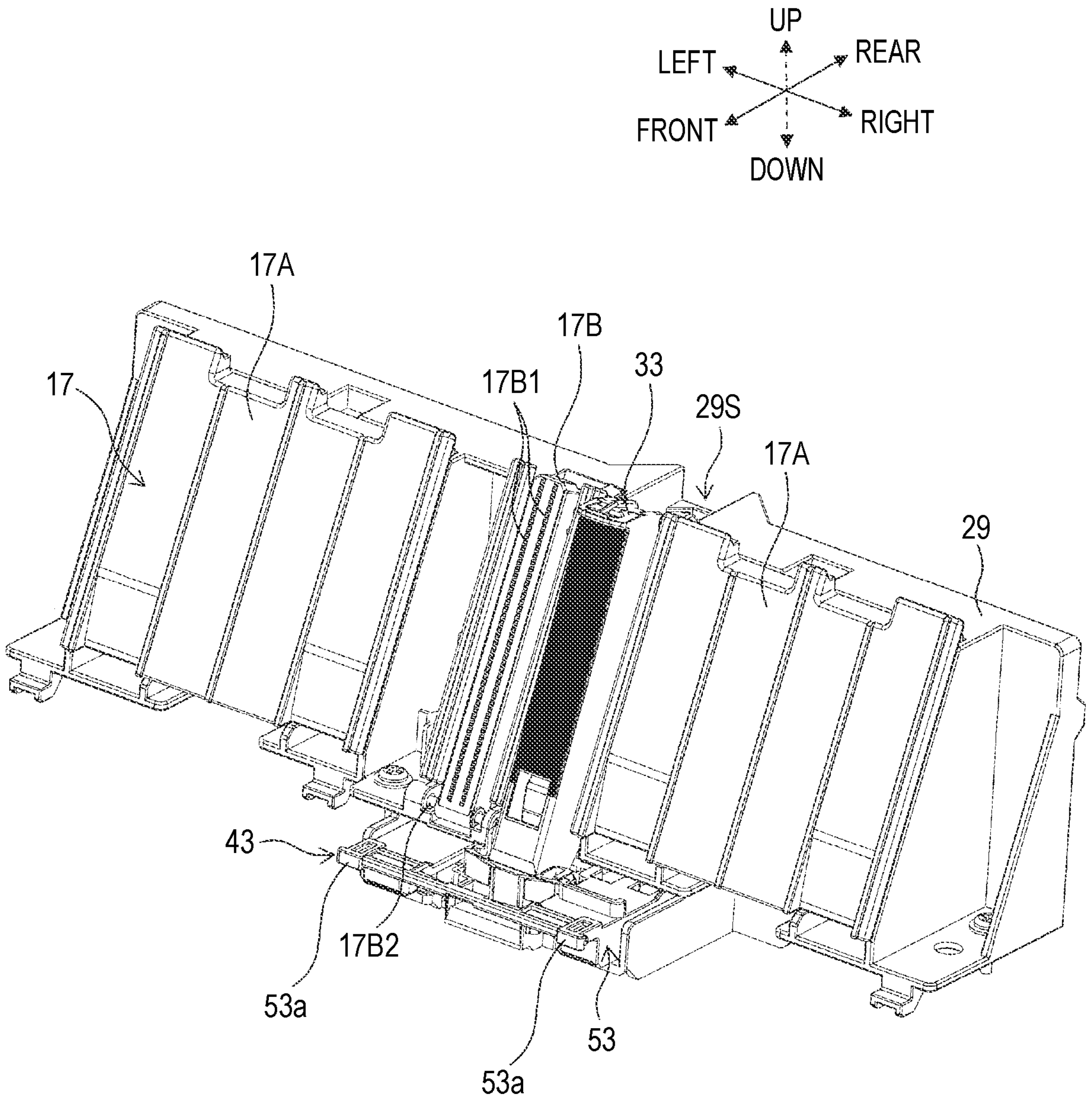
FIG. 10 is a perspective view illustrating a configuration of the stopper, a guide member, and a guide wall portion in the image recording apparatus.

FIG. 10 shows a configuration of the stopper 33, the guide member 17, and the guide wall portion 29 in the image recording apparatus 1. FIG. 10 shows the stopper 33 in the restriction state.

As shown in FIG. 10, the guide member 17 is supported at the front side of the guide wall portion 29. The guide member 17 is provided on a rear side of the feed roller 7 and upstream of the cutter mechanism 11 in the conveyance direction. The guide member 17 guides the cut sheet P1 or the roll sheet P2 fed by the feed roller 7 to the cutter mechanism 11 along the conveyance path TR. The guide member 17 is inclined with respect to the up-down direction so as to be located rearward toward the upper side. The guide member 17 elongates along the left-right direction, and is formed longer than a width of the cut sheet P1 and the roll sheet P2 in the left-right direction.

The guide member 17 includes paper guides 17A and the bank 17B. Front surfaces of the paper guides 17A and a front surface of the bank 17B constitute the guide surface of the guide member 17. The paper guides 17A are plate-shaped members disposed on both left and right sides of the bank 17B and the stopper 33. The bank 17B is disposed, for example, on a left side of the stopper 33 between the pair of paper guides 17A. On a surface of the bank 17B, the plurality of minute concavo-convex portions 17B1 are formed so as to repeat minute concavo-convex patterns along the conveyance direction. The bank 17B is pivotably supported around a rotation shaft member 17B2 provided at a lower end thereof. On a rear side of the bank 17B, a spring 42 (see FIG. 14 to be described later) is provided between the bank 17B and the guide wall portion 29, and the bank 17B is elastically supported by the guide wall portion 29. The guide wall portion 29 has, at an intermediate position in the left-right direction, an accommodation space 29S accommodating the stopper 33 in the retraction state in which the stopper 33 is retracted rearward.

Figure 11:
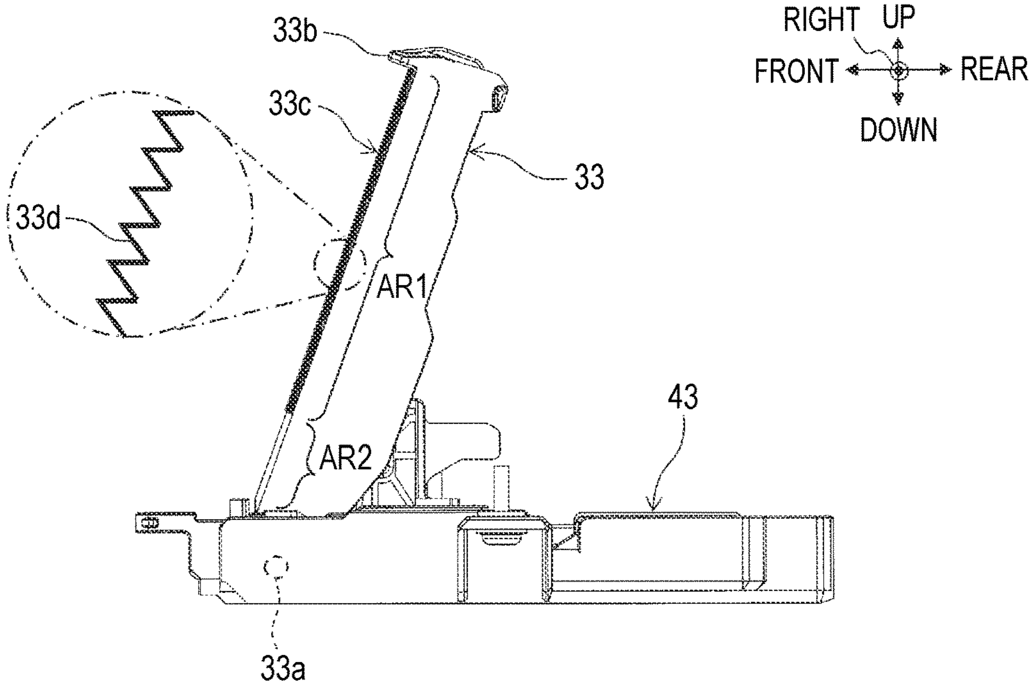
FIG. 11 is a side view illustrating an overall configuration of the stopper.
Figure 12:
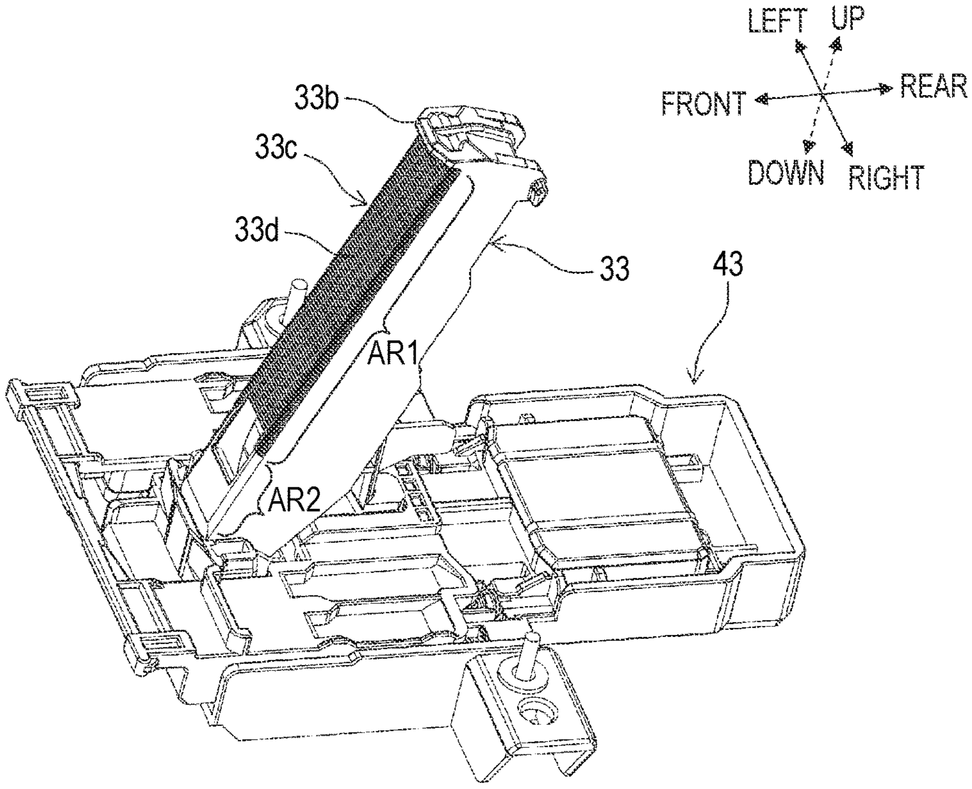
FIG. 12 is a perspective view illustrating the overall configuration of the stopper.

FIGS. 11 and 12 show an overall configuration of the stopper 33. FIGS. 11 and 12 show the stopper 33 in the restriction state. As shown in FIGS. 11 and 12, the stopper 33 is a columnar member which is erected in a manner of being inclined with respect to the up-down direction so as to be located rearward toward the upper side. The stopper 33 includes a rotation shaft member 33*a* at a lower end thereof, and is tiltably supported by a tilting mechanism 43 around the rotation shaft member 33*a*. When the feed tray 5 is pulled out from the housing 3, the tilting mechanism 43 brings the stopper 33 into the restriction state, and when the feed tray 5 is inserted into the housing 3, the stopper 33 is gently switched from the restriction state to the retraction state. Immediately after the feed tray 5 is inserted into the housing 3, the stopper 33 in the restriction state abuts against the leading end of the cut sheet P1 in the first accommodating portion 23, and the cut sheet P1 is prevented from reaching the cutter mechanism 11. Thereafter, the stopper 33 is switched to the retraction state, whereby the cut sheet P1 is allowed to reach the cutter mechanism 11.

As shown in FIG. 11, the stopper 33 includes a hammer portion 33*b* (an example of a preventing member) having a shape protruding forward at an upper end portion thereof. The hammer portion 33*b* abuts against the leading end of the cut sheet P1 to prevent the cut sheet P1 from entering the cutter mechanism 11 even when an inertial force acts on the cut sheet P1 in the first accommodating portion 23 when the feed tray 5 is vigorously inserted into the housing 3 and the cut sheet P1 advances to a downstream side in the conveyance direction along the conveyance path TR formed between the flap 35 and the stopper 33. A protruding direction of the hammer portion 33*b* is substantially perpendicular to an erection direction of the stopper 33. The erection direction of the stopper 33 is also a guide surface direction of the guide member 17, and is also a direction of the conveyance path TR of the cut sheet P1. The protruding direction of the hammer portion 33*b* may increase reliability of preventing the cut sheet P1 from entering the cutter mechanism 11.

As shown in FIGS. 11 and 12, the stopper 33 includes an abutment surface 33*c* that abuts against the cut sheet P1 at a front side thereof. The abutment surface 33*c* includes a first area AR1 including a plurality of minute concavo-convex portions 33*d* formed so as to repeat minute concavo-convex patterns along the conveyance direction, and a second area AR2 located below the first area AR1 and not including the plurality of concavo-convex portions 33*d*. The second area AR2 is, for example, an area corresponding to a thickness of ten-odd sheets of cut sheets P1.

Figure 13:
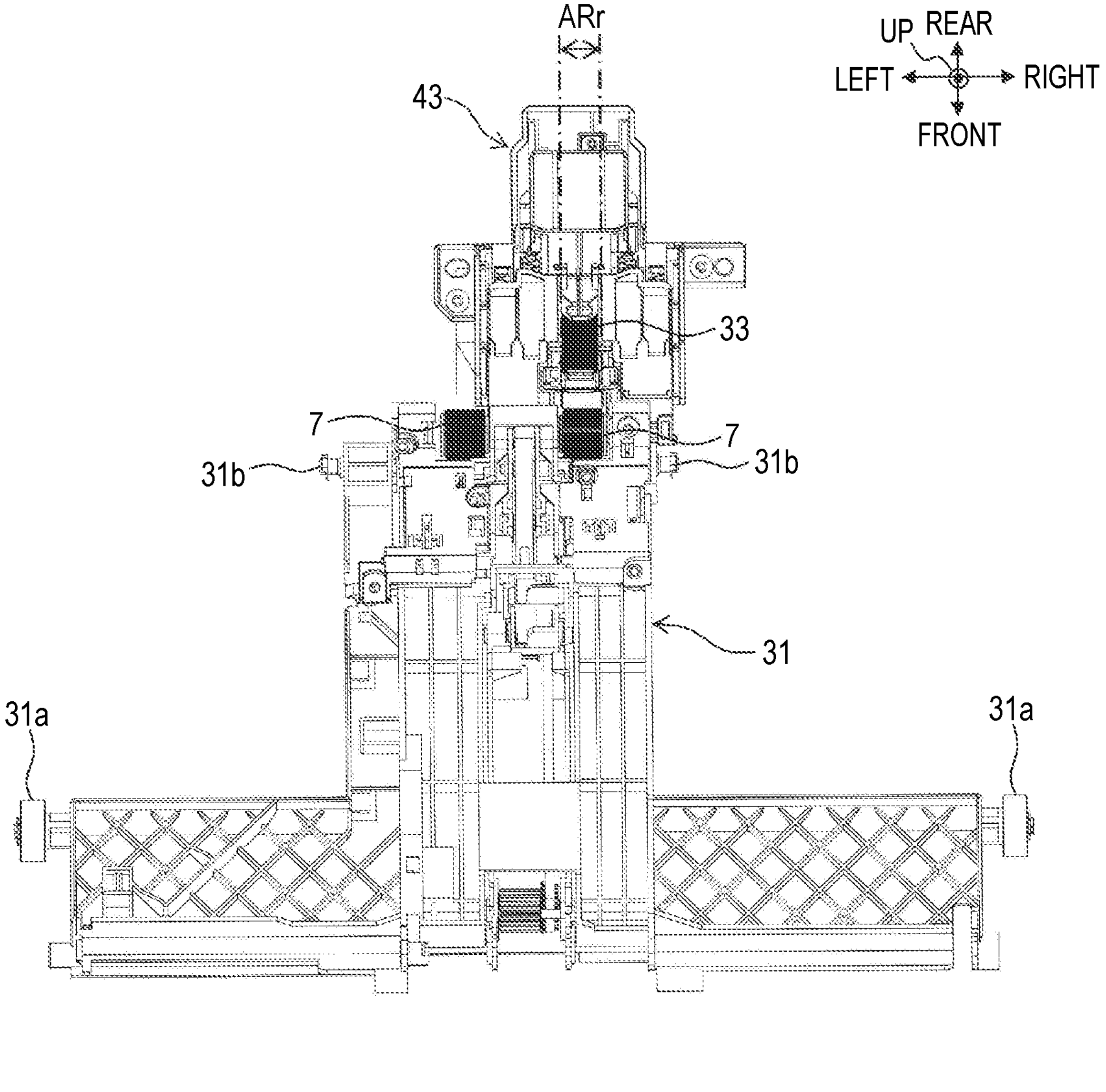
FIG. 13 is a top view illustrating a positional relationship between the stopper and a feed roller.

FIG. 13 shows a positional relationship between the stopper 33 and the feed rollers 7. As shown in FIG. 13, a pair of feed rollers 7 are arranged side by side with a gap in the left-right direction at the rear end portion of the swing arm 31. The stopper 33 is disposed so as to be within a range of an installation area ARr in the left-right direction of one (for example, right) feed roller 7 when viewed from above. It is not required that the entire stopper 33 is within the range of the installation area ARr, and for example, a portion of the abutment surface 33*c* in which the concavo-convex portions 33*d* are formed may be disposed within the range of the installation area ARr. When the feed tray 5 is inserted into or removed from the housing 3, the feed roller 7 is retracted to an upper position where the feed roller 7 does not interfere with the feed tray 5 by the pivoting of the swing arm 31. When the feed tray 5 is inserted into the housing 3, the stopper 33 abuts against the leading end of the cut sheet P1 in the first accommodating portion 23, and the feed roller 7 is lowered onto the cut sheet P1 by the pivoting of the swing arm 31, whereby the movement of the cut sheet P1 in the first accommodating portion 23 is decelerated and stopped. By installing the stopper 33 within the range of the installation area ARr which is an area obtained by projecting the feed roller 7 in the up-down direction, it is possible to efficiently decelerate the movement of the cut sheet P1, and it is possible to quickly stabilize the cut sheet P1.

Figure 14:
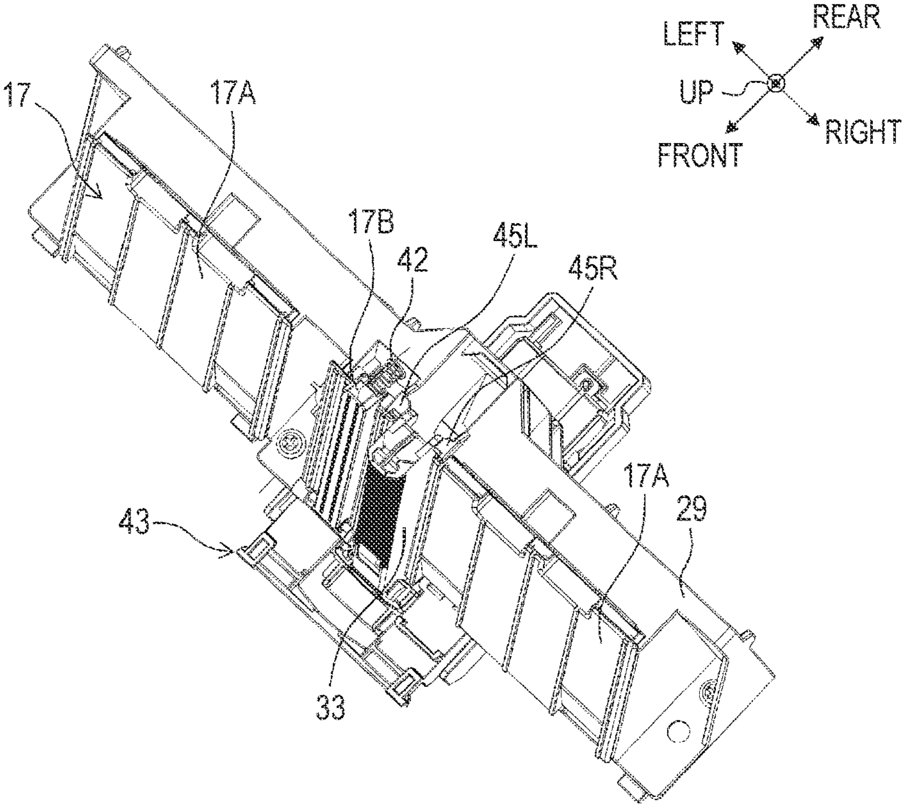
FIG. 14 is a perspective view illustrating a configuration of a member that restricts movement of the stopper.
Figure 15:
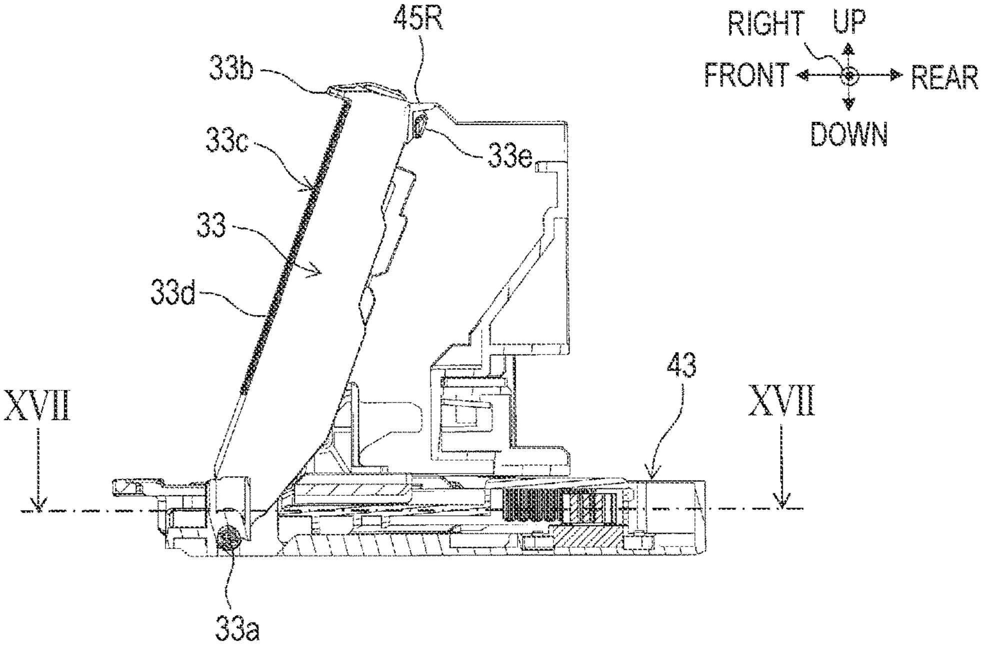
FIG. 15 is a side view illustrating the configuration of the member that restricts the movement of the stopper.

FIGS. 14 and 15 show a configuration of a member that restricts the movement of the stopper 33. As shown in FIGS. 14 and 15, a pair of restriction members 45L and 45R are provided on an upper portion of the guide wall portion 29 in a manner of sandwiching the upper end portion of the stopper 33 from both left and right sides. A pair of protrusions 33*e* protruding toward both sides in the left-right direction are provided on a rear side of the upper end portion of the stopper 33. The pair of protrusions 33*e* are engaged with the restriction members 45L and 45R, respectively. A right end portion of the right protrusion 33*e* abuts against the restriction member 45R, and a left end portion of the left protrusion 33*e* abuts against the restriction member 45L, whereby the movement of the stopper 33 in the left-right direction is restricted. As shown in FIG. 15, the restriction member 45R is formed in a shape covering a front side and an upper side of the protrusion 33*e*. The restriction member 45L also has a similar shape. A front end portion of the right protrusion 33*e* abuts against the restriction member 45R, and a front end portion of the left protrusion 33*e* abuts against the restriction member 45L, whereby forward pivoting (counterclockwise pivoting in FIG. 15) of the stopper 33 about the rotation shaft member 33*a* is restricted.

<Configuration and Operation of Stopper Tilting Mechanism>

Figure 16:
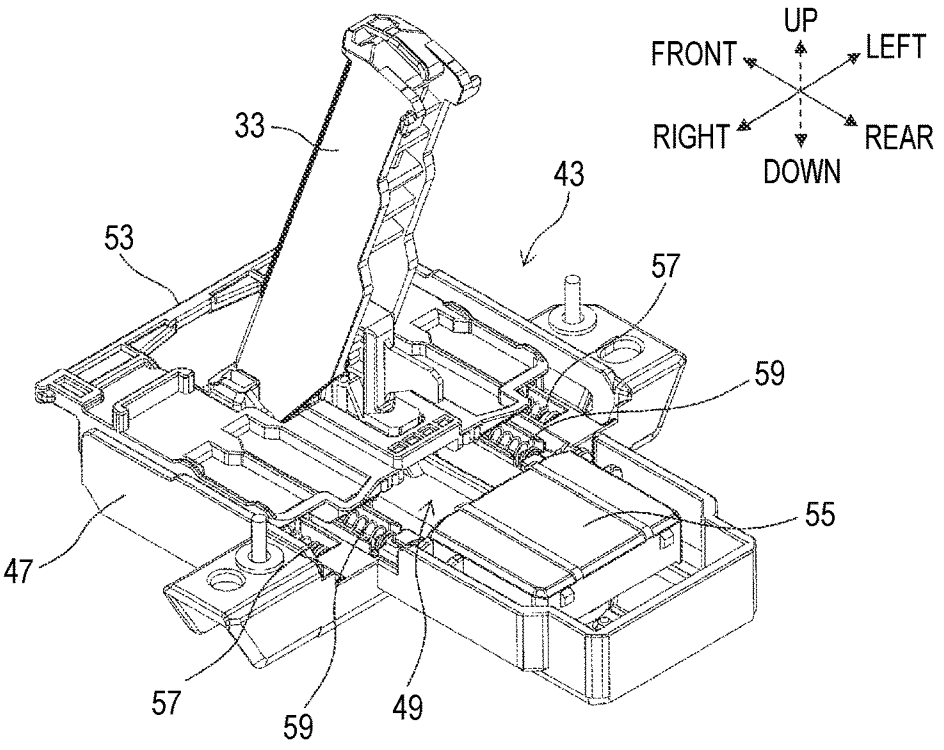
FIG. 16 is a perspective view illustrating a configuration of a tilting mechanism that tiltably supports the stopper.
Figure 17:
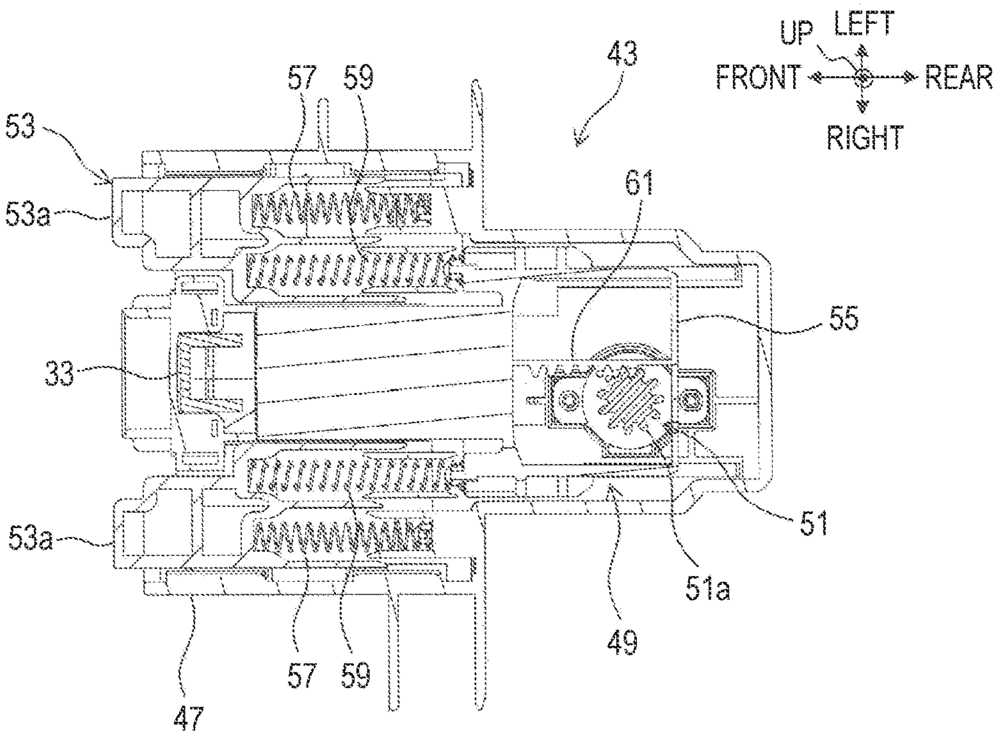
FIG. 17 is a cross-sectional view taken along a line XVII-XVII in FIG. 15 and illustrating the configuration of the tilting mechanism that tiltably supports the stopper.
Figure 18:
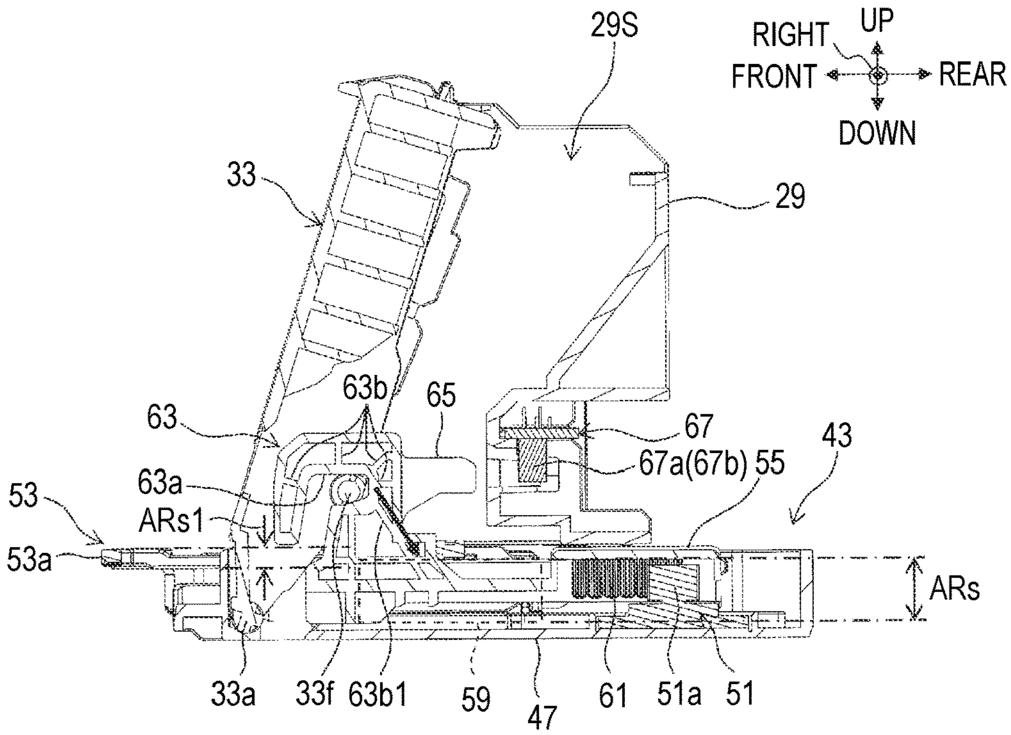
FIG. 18 is a side cross-sectional view illustrating the configuration of the tilting mechanism that tiltably supports the stopper.

FIGS. 16 to 18 show a configuration of the tilting mechanism 43 that tiltably supports the stopper 33. FIGS. 16 and 18 show the stopper 33 in the restriction state. FIG. 17 illustrates a cross-sectional configuration corresponding to a cross section taken along a line XVII-XVII in FIG. 15.

As shown in FIGS. 16 to 18, the tilting mechanism 43 includes a base 47, a moving member 49, and a gear damper 51. The base 47 is fixed to the housing 3 via the guide wall portion 29. The moving member 49 moves rearward (an example of a back side in the insertion direction) on the base 47 as the feed tray 5 is inserted into the housing 3. The moving member 49 includes a stopper slider 53 and a slide damper 55.

The stopper slider 53 is disposed in front of the tilting mechanism 43, and comes into contact with the leading end portion of the inserted feed tray 5. The stopper slider 53 is movable in the front-rear direction with respect to the base 47. A pair of springs 57 are provided between the stopper slider 53 and the base 47, and the stopper slider 53 is biased forward by the springs 57. When the feed tray 5 inserted into the housing 3 comes into contact with a front end portion of the stopper slider 53, the stopper slider 53 is pushed rearward against a biasing force of the spring 57 and moves to a given position on a rear side. When the feed tray 5 is pulled out from the housing 3, the stopper slider 53 is pushed forward by the biasing force of the spring 57 and moves to a given position at a front side. FIGS. 16 to 18 show a state in which the stopper slider 53 is at the given position at the front side.

The slide damper 55 (an example of an engaging member) is disposed behind the stopper slider 53 and movable in the front-rear direction with respect to the base 47. A pair of springs 59 are provided between the slide damper 55 and the stopper slider 53, and the slide damper 55 is biased rearward by the springs 59 as the stopper slider 53 moves rearward. The slide damper 55 includes a gear portion 61 on a rear side thereof. The gear portion 61 is configured as, for example, a rack. The gear portion 61 meshes with a gear portion 51*a* of the gear damper 51. When the feed tray 5 is inserted into the housing 3, the slide damper 55 is biased rearward by the spring 59 as the stopper slider 53 moves rearward, and slowly moves rearward while being buffered by the gear damper 51. When the feed tray 5 is pulled out from the housing 3, the slide damper 55 is pulled forward by the spring 59 as the stopper slider 53 moves forward, and slowly moves forward while being buffered by the gear damper 51.

As illustrated in FIG. 10, the stopper slider 53 includes a pair of contact portions 53*a* that contact the feed tray 5 on both left and right sides. As shown in FIG. 18, a range of an installation area ARs1 in the up-down direction of the contact portion 53*a* and a range of an installation area ARs in the up-down direction of the spring 59 are disposed in a manner of partially overlapping with each other in a side view. Accordingly, the movement of the stopper slider 53 in the front-rear direction may be smoothly transmitted to the spring 59. In the embodiment, the installation area ARs1 and the installation area ARs partially overlap, but the entire area ARs1 and the installation area ARs may overlap.

As shown in FIG. 18, the gear damper 51 is disposed so as to substantially overlap with the range of the installation area ARs in the up-down direction of the spring 59 in the side view. The entire gear damper 51 is not required to be within the range of the installation area ARs, and for example, a portion in which the gear portion 61 of the slide damper 55 and the gear portion 51*a* of the gear damper 51 mesh with each other may be disposed within a range of the installation area ARs. Accordingly, a height of a portion that receives a force from the spring 59 and a height of a portion that receives a force from the gear damper 51 may be made substantially equal to each other, and the slide damper 55 may be operated smoothly.

As shown in FIG. 18, on an upper side of a front end portion of the slide damper 55, a pair of cam members 63 are provided on both sides in the right and left direction. The cam member 63 is formed with a cam groove 63*a* that extends in the front-rear direction, is bent downward at the front side, and is open to the lower side. The stopper 33 includes a convex portion 33*f* protruding toward both sides in the left-right direction at an intermediate position in the up-down direction, and the convex portion 33*f* engages with the cam grooves 63*a*, whereby the stopper 33 is tiltably supported. The cam member 63 of the slide damper 55 is engaged with the convex portion 33*f* of the stopper 33 so as to move rearward when the stopper 33 changes from the restriction state to the retraction state and to move forward when the stopper 33 changes from the retraction state to the restriction state.

As shown in FIG. 18, the cam member 63 includes therein a plurality of rib portions 63*b* radially extending around the convex portion 33*f* engaged with the cam grooves 63*a*. When the cut sheet P1 abuts against the stopper 33 from the front, the stopper 33 receives a force so as to tilt rearward (clockwise in FIG. 18) about the rotation shaft member 33*a*. Therefore, the cam member 63 receives a compressive force in a tangential direction (direction of a black arrow in FIG. 18) of a circle centered on the rotation shaft member 33*a* and having a radius equal to a distance between the rotation shaft member 33*a* and the convex portion 33*f*. Among the plurality of rib portions 63*b* in the cam member 63, in particular, a rib portion 63*b*1 extends along the tangential direction. Accordingly, rigidity of the cam member 63 against the compressive force may be improved, and the slide damper 55 may be prevented from being damaged or the like.

A protrusion 65 (an example of a light blocking portion) that protrudes rearward is provided at a portion on a rear side of the slide damper 55. In the accommodation space 29S of the guide wall portion 29, a photosensor 67 (an example of a detection portion) is installed at a position corresponding to the protrusion 65. The photosensor 67 includes an emission port 67*a* for emitting light and an incidence port 67*b* for incidence of the light. The emission port 67*a* and the incidence port 67*b* are disposed in a manner of facing each other with a given gap therebetween in the left-right direction. When the slide damper 55 moves rearward, the protrusion 65 is inserted between the emission port 67*a* and the incidence port 67*b* of the photosensor 67 to block the incidence of the light. The photosensor 67 detects the rearward movement of the slide damper 55 when the protrusion 65 blocks the incidence of the light. Thus, the photosensor 67 detects the insertion of the feed tray 5 into the housing 3 based on an incident state of the light.

The gear damper 51 (an example of a damper) is fixed to the base 47 at a rear side of the tilting mechanism 43. The gear damper 51 includes the gear portion 51*a* that is rotatably disposed at an upper portion thereof and meshes with the gear portion 61 of the slide damper 55. In the gear damper 51, oil is sealed in a case, and a braking force is applied to rotation of the gear portion 51*a* by using viscous resistance of the oil.

Figure 19:
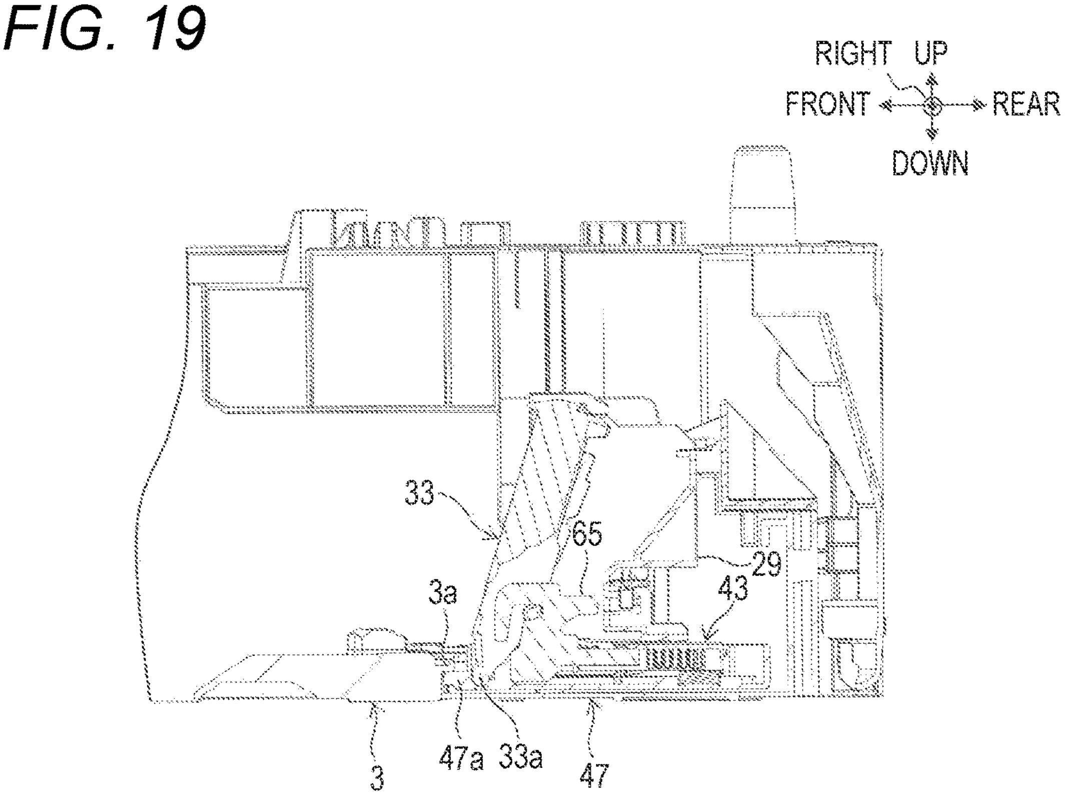
FIG. 19 is a side cross-sectional view illustrating a fitting structure between a housing and a base of the tilting mechanism.

As shown in FIG. 19, the base 47 includes a fitting portion 47*a* protruding forward at a front end portion thereof. The housing 3 includes a fitting portion 3*a* protruding rearward at a position above the fitting portion 47*a* of the base 47. The fitting portion 47*a* and the fitting portion 3*a* are fitted to each other. When the cut sheet P1 collides with the stopper 33 at the time of the insertion of the feed tray 5 into the housing 3, the stopper 33 tends to rotate in the clockwise direction about the rotation shaft member 33*a*, and a force of the stopper 33 is transmitted and the base 47 also tends to rotate in the clockwise direction. A fitting structure of the fitting portion 47*a* and the fitting portion 3*a* may prevent deformation of the base 47, and thus may prevent sagging of the cut sheets P1.

Figure 20:
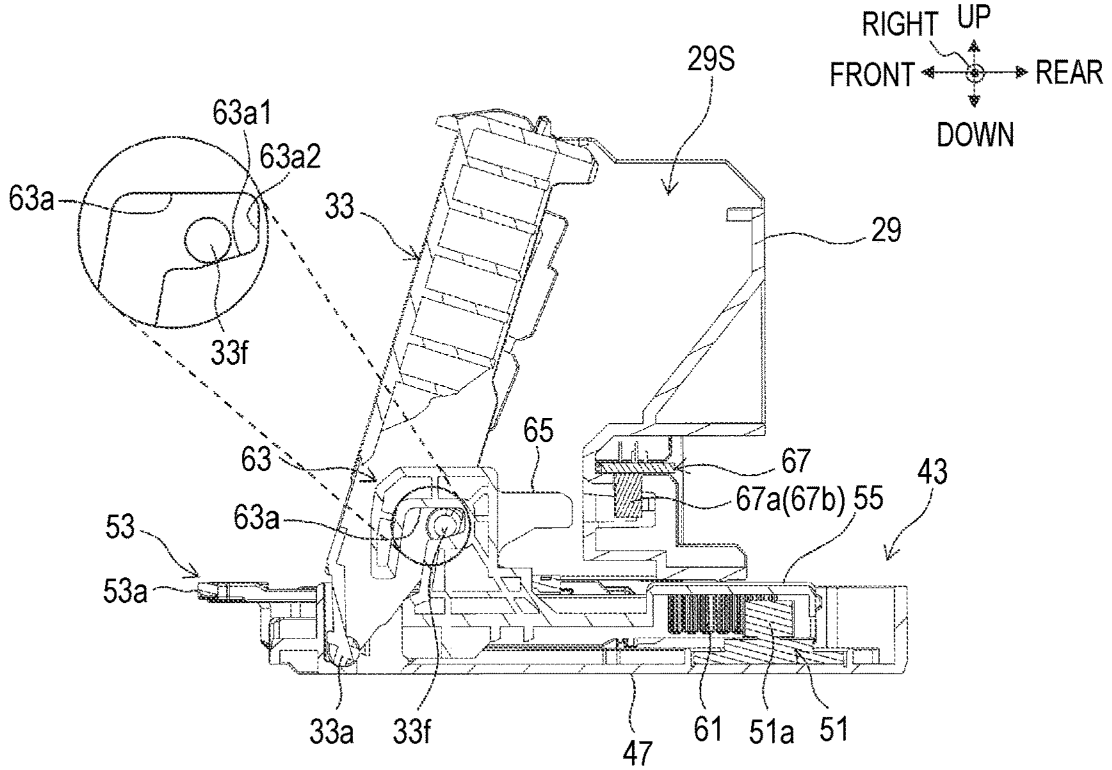
FIG. 20 is a side cross-sectional view illustrating operations of the tilting mechanism and the stopper before the feed tray is inserted into the housing.
Figure 21:
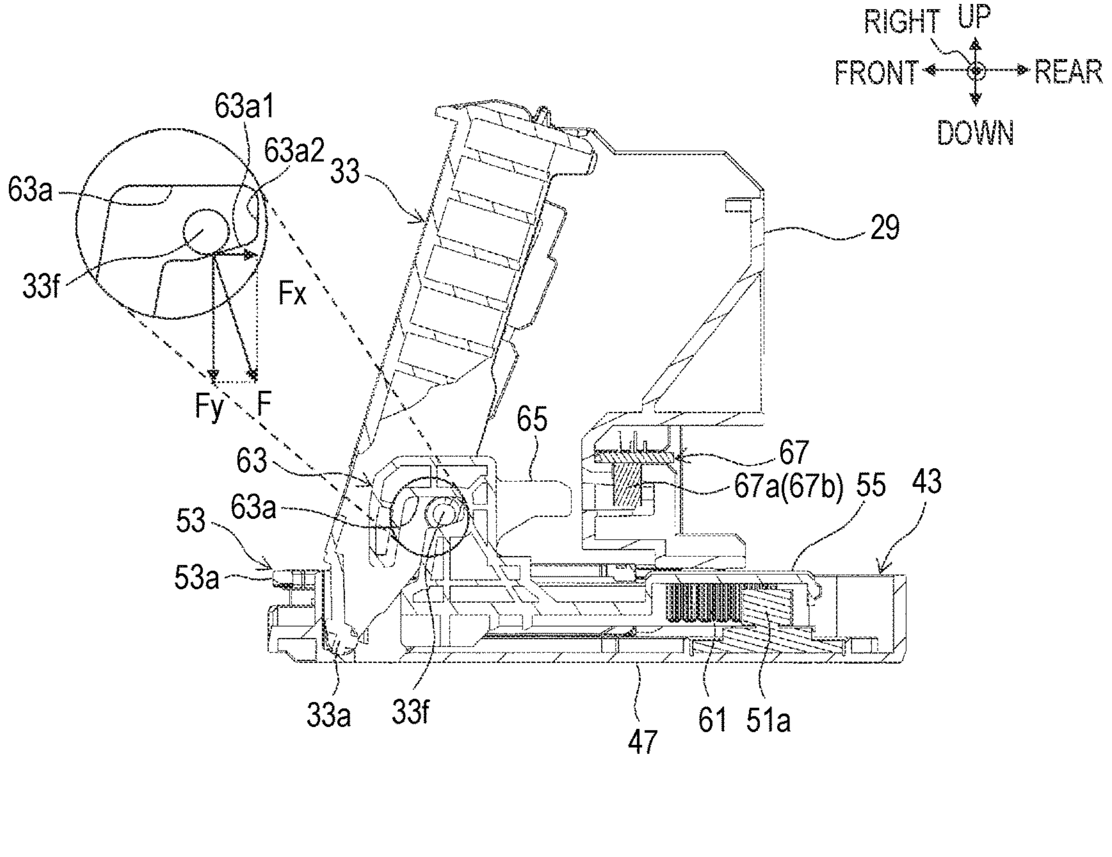
FIG. 21 is a side cross-sectional view illustrating the operations of the tilting mechanism and the stopper immediately after the feed tray is inserted into the housing.

FIGS. 20 to 26 illustrate operations of the tilting mechanism 43 and the stopper 33 when the feed tray 5 is inserted into the housing 3. FIG. 20 illustrates a state before the feed tray 5 is inserted into the housing 3, that is, while the feed tray 5 is being pulled out from the housing 3. As shown in the partially enlarged view of FIG. 20, the cam groove 63*a* of the cam member 63 of the slide damper 55 is provided with an inclined portion 63*a*1. In a state shown in FIG. 20, the convex portion 33*f* of the stopper 33 comes into contact with the inclined portion 63*a*1 to prevent the cam groove 63*a* from coming into contact with a rear end portion 63*a*2. When the feed tray 5 is inserted into the housing 3, the rear end portion of the feed tray 5 comes into contact with a front end portion of the stopper slider 53, and the stopper slider 53 moves rearward as illustrated in FIG. 21. At this time, the cut sheet P1 collides with the stopper 33, the stopper 33 tends to rotate clockwise about the rotation shaft member 33*a*, and a force F in a direction orthogonal to the inclined portion 63*a*1 with which the convex portion 33*f* of the stopper 33 is in contact is applied. A rearward horizontal component Fx of the force F serves as a thrust for moving the slide damper 55 rearward.

Figure 22:
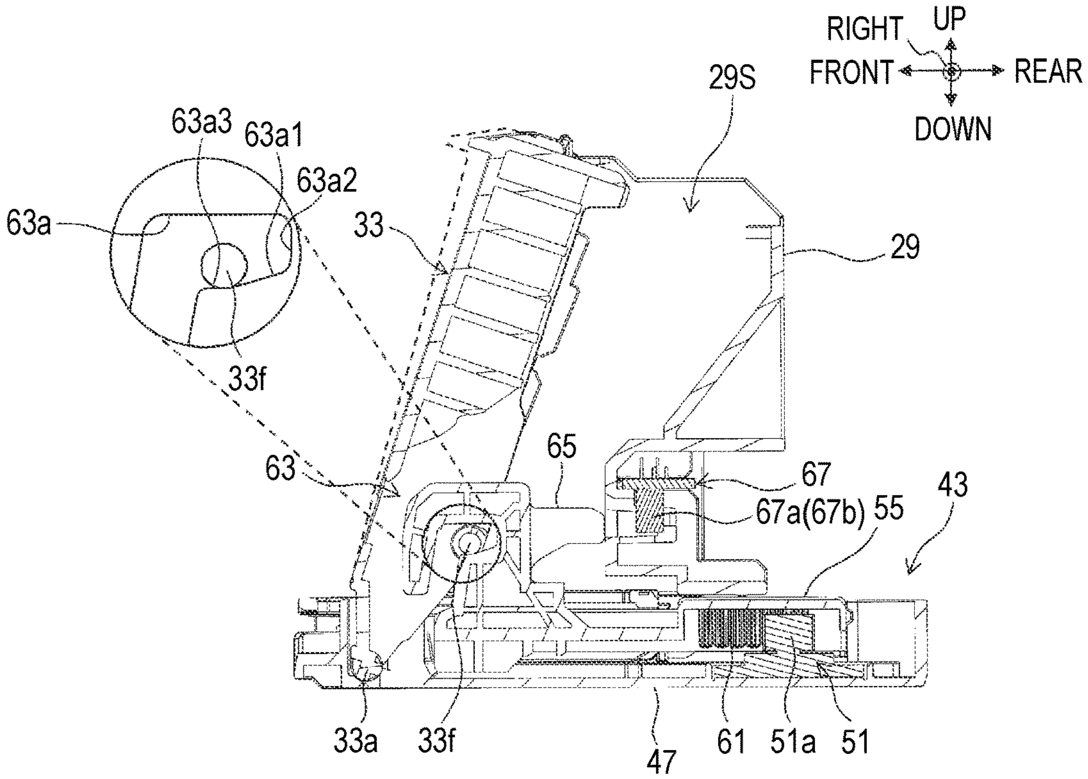
FIG. 22 is a side cross-sectional view illustrating the operations of the tilting mechanism and the stopper after the feed tray is inserted into the housing.

The slide damper 55 is biased rearward by the spring 59 as the stopper slider 53 moves rearward along with the thrust of the horizontal component Fx, and slowly moves rearward while being buffered by the gear damper 51. As the slide damper 55 moves rearward, the convex portion 33*f* of the stopper 33 comes into contact with a horizontal straight portion 63*a*3 located at a front side of the inclined portion 63*a*1 of the cam groove 63*a* as shown in FIG. 22. Accordingly, the stopper 33 is tilted rearward by a small amount and retracted.

Figure 23:
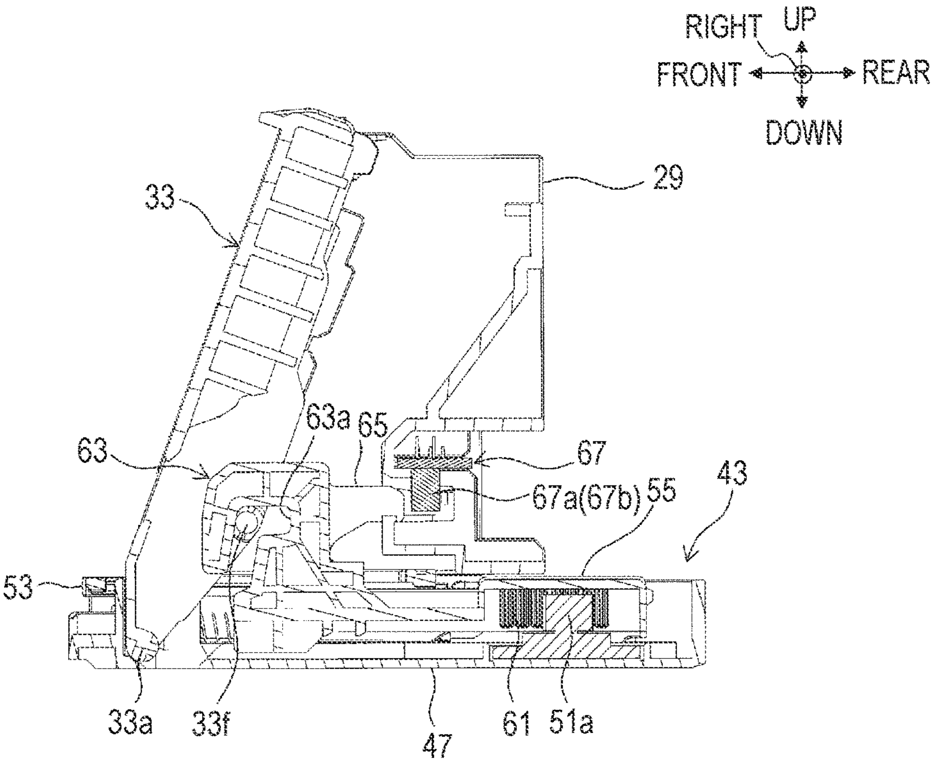
FIG. 23 is a side cross-sectional view illustrating the operations of the tilting mechanism and the stopper after the feed tray is inserted into the housing.

When the slide damper 55 is further moved rearward while being buffered by the gear damper 51, as shown in FIG. 23, the convex portion 33*f* of the stopper 33 is moved to a front end portion of the cam groove 63*a* of the cam members 63 of the slide damper 55. States shown in FIGS. 20 to 23 correspond to the restriction state of the stopper 33.

Figure 24:
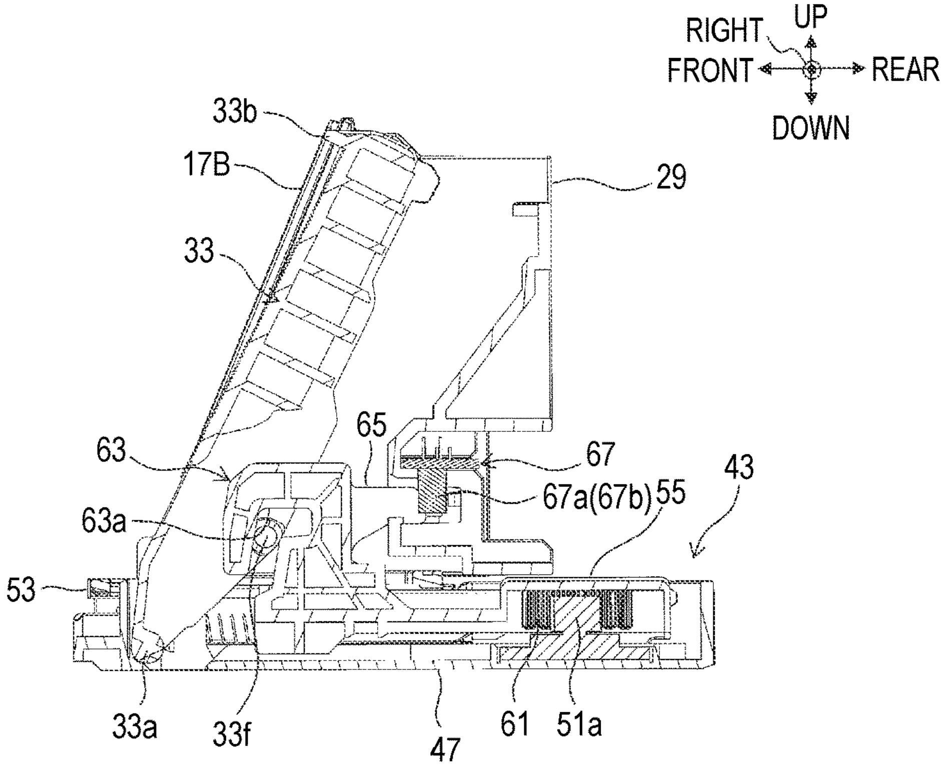
FIG. 24 is a side cross-sectional view illustrating the operations of the tilting mechanism and the stopper after the feed tray is inserted into the housing.
Figure 25:
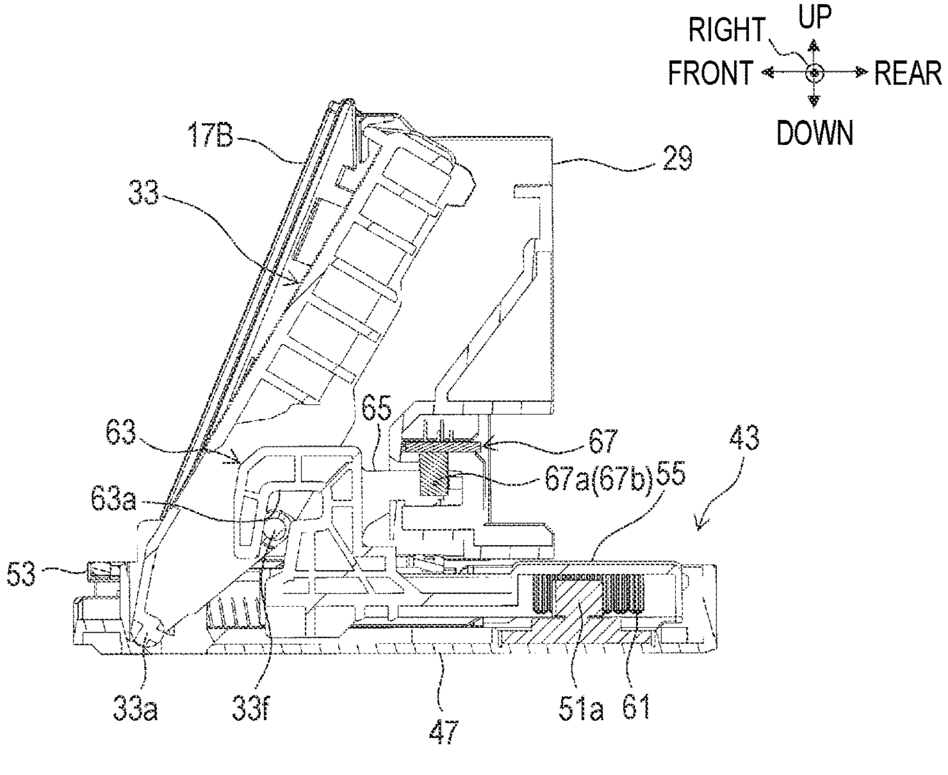
FIG. 25 is a side cross-sectional view illustrating the operations of the tilting mechanism and the stopper after the feed tray is inserted into the housing.
Figure 26:
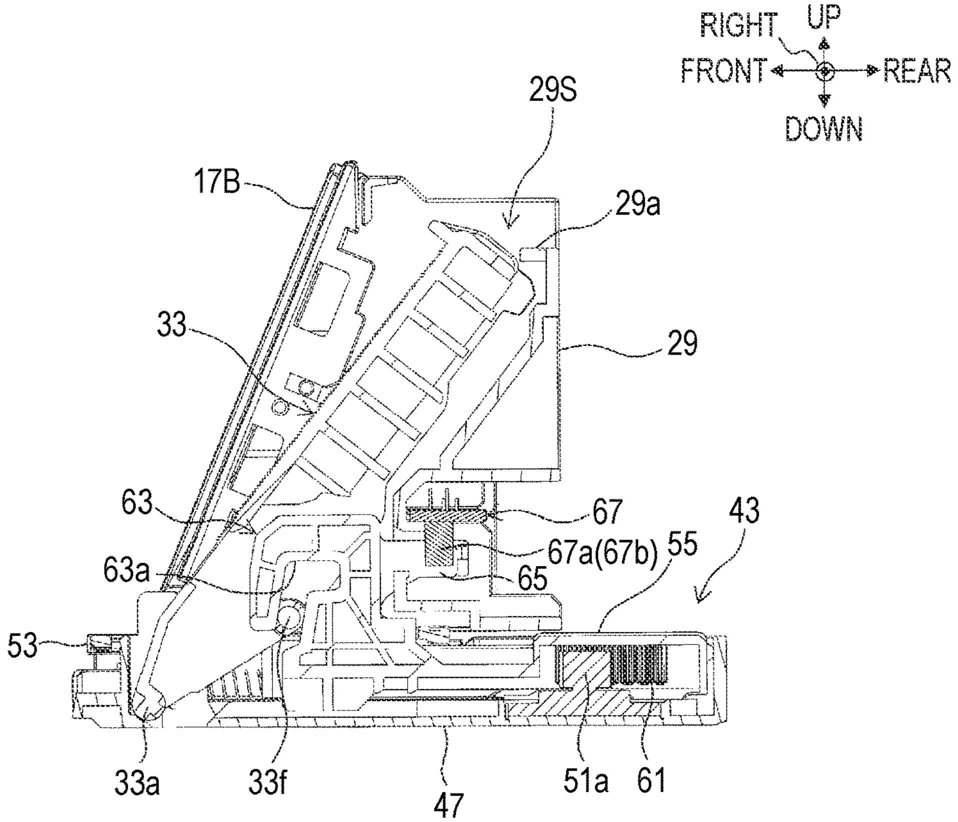
FIG. 26 is a side cross-sectional view illustrating the operations of the tilting mechanism and the stopper after the feed tray is inserted into the housing.

As shown in FIG. 24, a convex portion 33*f* of the stopper 33 gradually moves downward due to a bent shape of the cam groove 63*a*. Along with this, the stopper 33 tilts rearward. FIG. 24 shows a state in which the entire stopper 33 including the hammer portion 33*b* is retracted rearward from the guide surface including the surface of the bank 17B. When the convex portion 33*f* of the stopper 33 moves further downward along the cam groove 63*a* and the stopper 33 tilts further rearward in accordance with this, as shown in FIG. 25, the protrusion 65 of the slide damper 55 is inserted between the emission port 67*a* and the incidence port 67*b* of the photosensor 67 to block the light. Accordingly, the photosensor 67 detects the insertion of the feed tray 5 into the housing 3. When the convex portion 33*f* of the stopper 33 moves further downward along the cam groove 63*a* and the stopper 33 is further tilted rearward in accordance with this, as shown in FIG. 26, a rear portion of the upper end of the stopper 33 abuts against a stopper holder 29*a* provided in the accommodation space 29S of the guide wall portion 29, and the tilting of the stopper 33 is completed. States shown in FIGS. 24 to 26 correspond to the retraction state of the stopper 33.

Effects of Embodiment

As described above, in the image recording apparatus 1 according to the present embodiment, the plurality of cut sheets P1 are stacked in the first accommodating portion 23 of the feed tray 5 inserted into the housing 3. The cut sheets P1 in the first accommodating portion 23 is guided to the conveyance path TR by the guide member 17, and a desired image is recorded by the head 13 on the conveyance path TR. The image recording apparatus 1 according to the present embodiment is provided with the stopper 33 that is movable between the restriction state and the retraction state. When the feed tray 5 is inserted into the housing 3, the stopper 33 in the restriction state abuts against the leading end of the cut sheet P1 to prevent the cut sheet P1 from reaching the cutter mechanism 11.

Figure 27:
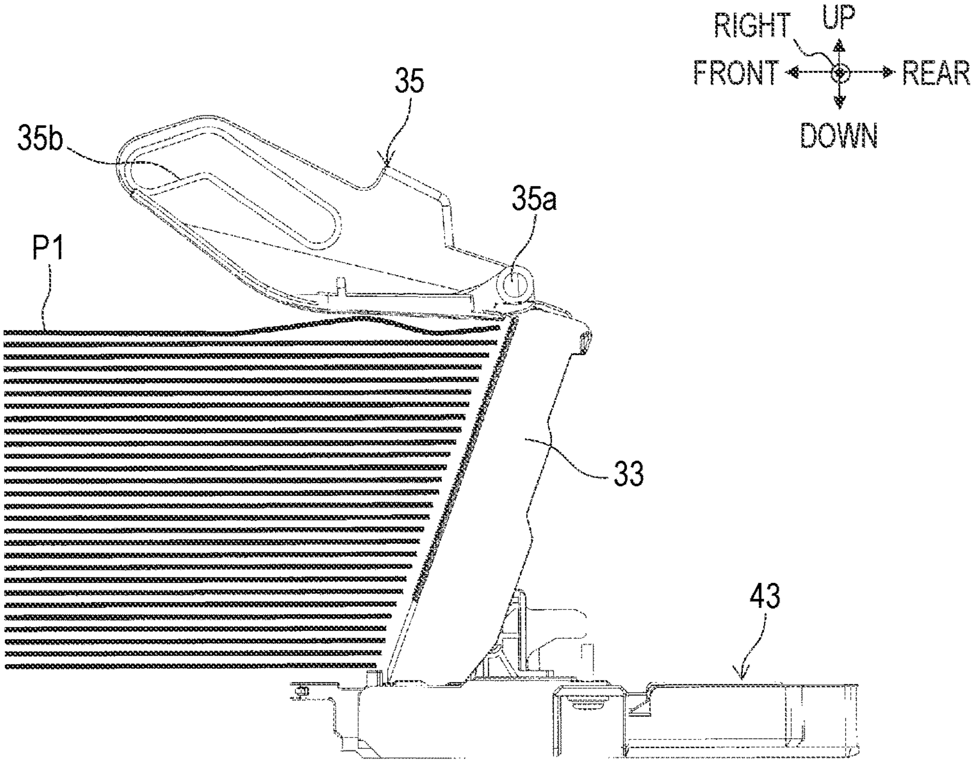
FIG. 27 is an illustration view illustrating a function of stabilizing a cut sheet by the flap when the feed tray is inserted into the housing.

The image recording apparatus 1 further includes the flap 35. The flap 35 is movable in the up-down direction by the pivoting about the rotation axis AX, is located above the cut sheet P1 stacked in the first accommodating portion 23, and is provided on the side opposite to the stopper 33 with the stacked cut sheets P1 interposed therebetween. As shown in FIG. 27, for example, even when the feed tray 5 is inserted vigorously and at least a part of the cut sheet P1 runs up the inclined surface of the stopper 33 and flutters, the flap 35 is provided on the side opposite to the stopper 33 with the cut sheets P1 interposed therebetween, and the cut sheet P1 may be restrained by both the stopper 33 and the flap 35, and thus the cut sheet P1 may be stopped in the stable state. According to the present embodiment, since the cut sheet P1 is stopped in the stable state by the stopper 33 and the flap 35, it is possible to prevent an adverse effect on subsequent feeding.

Further, particularly in the present embodiment, the flap 35 includes the rotation shaft members 35*a* serving as rotation centers at the time of pivoting at a rear side which is the back side along the insertion direction of the feed tray 5, and the rotation shaft members 35*a* are pivotably supported by the fixed chute 37 which is a structural member fixed to the housing 3. The flap 35 is engaged with the swing arm 31, which rotatably supports the feed roller 7, via the elongated holes 35*b* and the convex portions 31*b* at a front side, which is a front side along the insertion direction.

According to the present embodiment, the front side of the flap 35 is supported by the swing arm 31 having high rigidity for supporting the feed roller 7, and a rear side of the flap 35 is supported by the fixed chute 37 which is the fixed structure member. Since both sides of the flap 35 in the front-rear direction are supported by the large rigidity structures, even if the above-described inertial force acts when the feed tray 5 is vigorously inserted, the flap 35 is hardly deformed.

Particularly in the present embodiment, the feed tray 5 is provided with the second accommodating portion 25, and the roll sheet P2 unwound from the roll body R in the second accommodating portion 25 is guided to the conveyance path TR by the flap 35. The guided roll sheet P2 is cut to a specific length by the cutter mechanism 11 provided downstream of the conveyance path TR. According to the present embodiment, the flap 35 may serve two functions, that is, a function of guiding the roll sheet P2 from the second accommodating portion 25 and a function of stably stopping the cut sheet P1 from the first accommodating portion 23 when the feed tray 5 is inserted.

Further, particularly in the present embodiment, a front side of the flap 35 is supported by the swing arm 31 having high rigidity, and a rear side of the flap 35 is supported by the fixed chute 37 fixed to the cutter frame 39 supporting the cutter mechanism 11. According to the present embodiment, since both sides of the flap 35 in the front-rear direction are supported by the rigid structures of the swing arm 31 and the fixed chute 37, the flap 35 is hardly deformed.

Further, particularly in the present embodiment, the stopper 33 is provided with the hammer portion 33*b*. Even if the above-described inertial force acts when the feed tray 5 is inserted into the housing 3 vigorously and the cut sheet P1 advances to the downstream side in the conveyance direction between the flap 35 and the stopper 33, the hammer portion 33*b* may prevent the cut sheet P1 from entering the cutter mechanism 11.

Particularly in the present embodiment, the upper end portion of the stopper 33 and the rear end portion of the flap 35 overlap with each other in the side view, and the stopper 33 and the flap 35 overlap with each other in the side view. Accordingly, even if the above-described inertial force acts on the cut sheet P1 when the feed tray 5 is inserted vigorously into the housing 3 and the cut sheet P1 advances to the downstream side in the conveyance direction between the flap 35 and the stopper 33, the cut sheet P1 may be prevented from entering the cutter mechanism 11 on the downstream side by the above-described overlapping configuration.

Particularly in the present embodiment, the stopper 33 includes the plurality of concavo-convex portions 33*d* on the abutment surface 33*c* against the cut sheet P1. Accordingly, in the case in which the above-described inertial force acts on the cut sheet P1 when the feed tray 5 is inserted into the housing 3 vigorously, and the cut sheet P1 advances to the rear side, the movement of the cut sheet P1 may be efficiently stopped by the plurality of concavo-convex portions 33*d* provided on the abutment surface 33*c*, and the sagging of the cut sheet P1 may be prevented.

Figure 28:
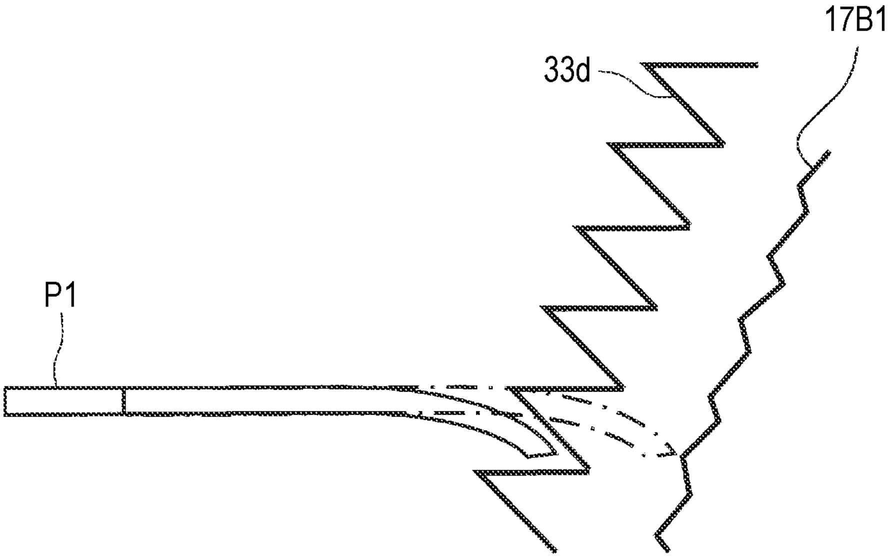
FIG. 28 is an illustration view showing a behavior of a leading end portion of the cut sheet in a case in which concavo-convex portions are formed in an entire area of an abutment surface of the stopper in an up-down direction.
Figure 29:
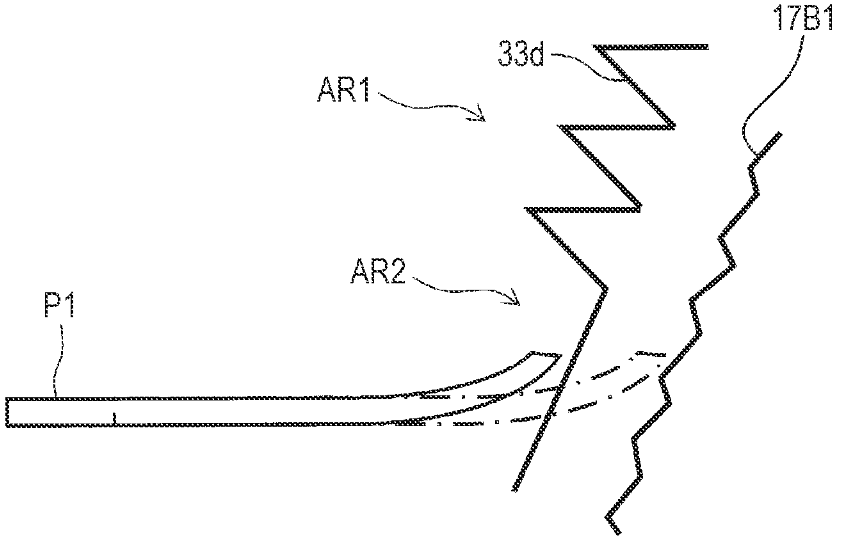
FIG. 29 is an illustration view showing the behavior of the leading end portion of the cut sheet in a case in which the concavo-convex portions are not formed on a lower side of the abutment surface of the stopper.

Further, particularly in the present embodiment, the plurality of concavo-convex portions 33*d* are provided in the first area AR1 located on the upper side of the abutment surface 33*c* of the stopper 33, and the concavo-convex portions 33*d* are not provided in the second area AR2 located on the lower side. If the concavo-convex portions 33*d* are formed in the entire area of the abutment surface 33*c* of the stopper 33 in the up-down direction, as shown in FIG. 28, when the leading end portion of the cut sheet P1 advancing to the rear side enters in a cat claw state of a downward curved shape, the cut sheet P1 may abut against the concavo-convex portions 17B1 on the surface of the bank 17B while the downward curved shape is maintained by the concavo-convex portions 33*d*, and the cut sheet P1 may not be led out to the downstream side in the conveyance direction, resulting in the paper jam. In the present embodiment, by providing the smooth second area AR2 not including the concavo-convex portions on the lower side of the stopper 33, as shown in FIG. 29, even when the leading end portion of the cut sheet P1 advancing to the rear side enters in the cat claw state of the downward curved shape, the cut sheet P1 is slid upward on the surface of the smooth second area AR2 to form the upward curved shape and abuts against the concavo-convex portions 17B1 on the surface of the bank 17B, whereby the cut sheet P1 may be guided to the downstream side in the conveyance direction. Accordingly, it is possible to prevent the occurrence of the paper jam. According to the present embodiment, it is possible to achieve an effect of preventing the conveyance jam due to the cut sheet P1 in the cat claw state while preventing the sagging of the cut sheet P1 as described above.

Particularly in the present embodiment, when the feed tray 5 is inserted into the housing 3, the photosensor 67 detects the insertion of the feed tray 5 into the housing 3. Specifically, the moving member 49 that moves to the rear side as the feed tray 5 is inserted is provided, and when the moving member 49 moves to the rear side, the protrusion 65 provided on the moving member 49 blocks the incidence of the light on the photosensor 67, thereby performing the detection. According to the present embodiment, since the rearward movement of the moving member 49 is buffered by the gear damper 51, even when the feed tray 5 is inserted vigorously, the rapid rearward movement of the moving member 49 is prevented, and stable detection with high reliability may be performed.

Particularly in the present embodiment, when the movement of the moving member 49 caused by the insertion of the feed tray 5 is detected by the light blocking of the photosensor 67 as described above, for example, if the stopper 33 is used as a moving member, the insertion of the feed tray 5 is not detected if the stopper 33 to which a load from the cut sheets P1 is applied is damaged each time the feed tray 5 is inserted. In the present embodiment, the moving member 49 includes the slide damper 55 that engages with the stopper 33, and the rearward movement of the slide damper 55 is slowed down by the gear damper 51 that meshes with the gear portion 61 provided on the slide damper 55. The protrusion 65 is provided at the rear portion of the slide damper 55, and as the slide damper 55 moves while being slowed down as described above, the protrusion 65 is gently inserted between the emission port and the incidence port of the photosensor 67 and is blocked from the light. According to the present embodiment, since the slide damper 55 engaged with the stopper 33 instead of the stopper 33 performs the light blocking in the photosensor 67, even if the stopper 33 is damaged, it is possible to detect the insertion of the feed tray 5.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

Modifications

The present disclosure is not limited to the above-described embodiment and various modifications may be made within the scope not deviating from the gist and technical idea thereof.

Figure 30:
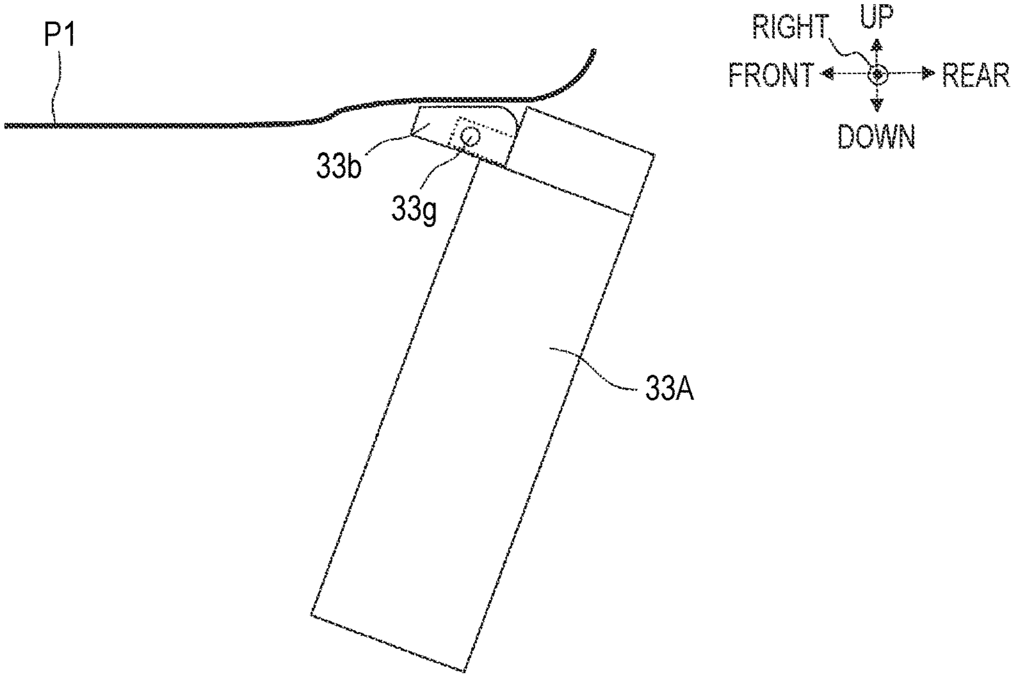
FIG. 30 is a schematic view schematically illustrating a configuration of a stopper according to a modification in which a hammer portion of the stopper is pivotable.
Figure 31:
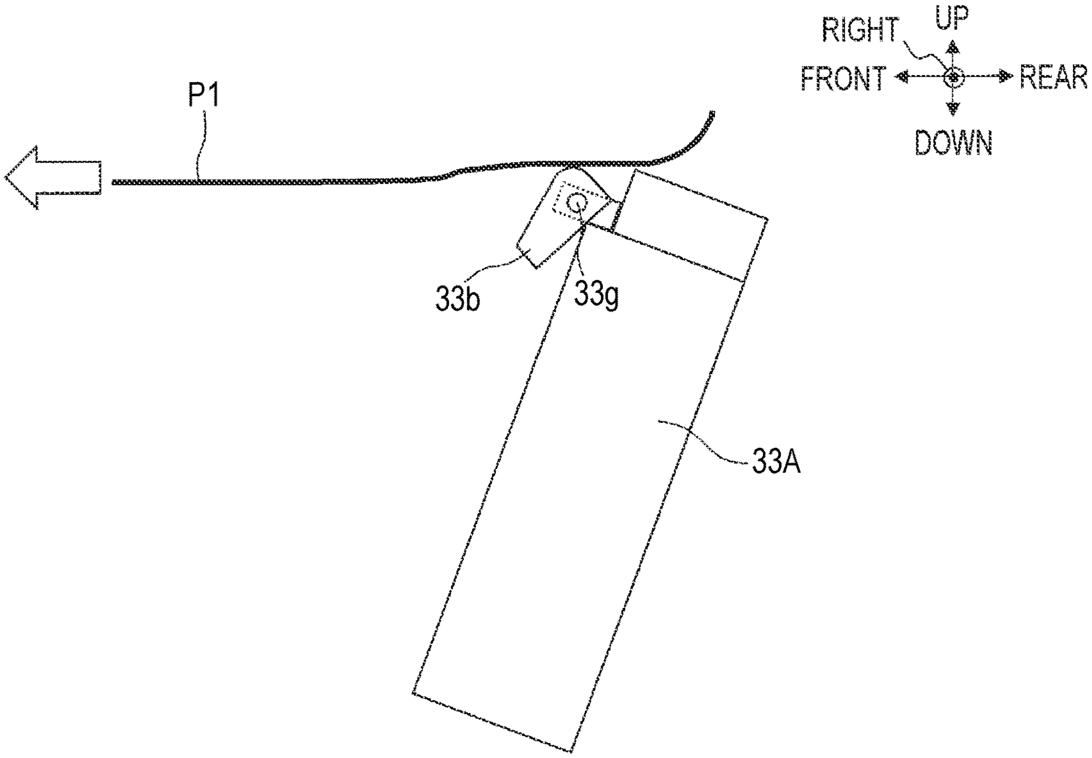
FIG. 31 is a schematic view schematically illustrating a state in which the hammer portion of the stopper is pivoted when a sheet is pulled out.

For example, the hammer portion 33*b* of the stopper 33 may be pivotable. FIGS. 30 and 31 schematically show a configuration of a stopper 33A according to the present modification. As shown in FIG. 30, the stopper 33A includes, as a separate body, the hammer portion 33*b* having a shape protruding forward at an upper end portion. The hammer portion 33*b* is pivotably provided about a rotation shaft member 33*g*. The hammer portion 33*b* is biased by a spring (not shown) so as to return to an initial position shown in FIG. 30. When the cut sheet P1 or the roll sheet P2 is jammed in the conveyance path TR, the cut sheet P1 or the roll sheet P2 is pulled out forward by a user as shown in FIG. 31. At this time, a tip of the hammer portion 33*b* pivots in a downward direction (counterclockwise direction in FIG. 31), whereby interference of the hammer portion 33*b* with the cut sheet P1 may be reduced, and damage to the cut sheet P1 may be prevented. After the cut sheet P1 is pulled out and the paper jam is eliminated, the hammer portion 33*b* returns to the initial position shown in FIG. 30 by the spring. Since a configuration of the stopper 33A other than the above is the same as that of the stopper 33 according to the above-described embodiment, a description thereof will be omitted.

In the above-described embodiment, the stopper 33 is disposed within the range of the installation area ARr of the feed roller 7 on the right side in the top view, but the present disclosure is not limited thereto. For example, the stopper 33 may be disposed within a range of the installation area ARr of the feed roller 7 on the left side opposite to the right side. The stopper 33 may be disposed in an area between the pair of feed rollers 7 disposed at an interval in the left-right direction.

In addition to those described above, methods according to the embodiments and the modifications may be used in combination as appropriate.

In the above description, when there is description such as “vertical”, “parallel”, “plane” and the like, the description does not have a strict sense. That is, the terms “vertical”, “parallel” and “plane” allow a tolerance or an error in design or manufacturing, and means “substantially vertical”, “substantially parallel” and “substantially planar”.

In the above description, when there is a description such as “same”, “equal”, “different” and the like in an external dimension or size, the description does not have a strict sense. That is, the terms “same”, “equal” and “different” allow a tolerance or an error in design or manufacturing, and mean “substantially the same”, “substantially equal” and “substantially different”.

In addition, although not individually exemplified, the present disclosure is implemented in various modified forms without departing from the gist thereof

What is claimed is:

1. An image recording apparatus comprising:

a housing in which a conveyance path is formed;

a feed tray insertable into and removable from the housing, configured to accommodate sheet media, and including a first accommodating portion configured to accommodate the sheet media in a vertically stacked state;

an image recording portion configured to record an image on one of the sheet media in the conveyance path;

a guide member provided at a portion of the housing which faces an end portion of the feed tray inserted into the housing, and configured to guide one of the sheet media in the first accommodating portion to the conveyance path;

a stopper movable between a restriction state in which the stopper abuts against a leading end of the sheet medium in the first accommodating portion to prevent the sheet medium from reaching a bank provided in the guide member and a retraction state in which the stopper is separated from the leading end of the sheet medium to allow the sheet medium to reach the guide member, when the feed tray is inserted into the housing; and a flap provided above the sheet media stacked in the first accommodating portion and on a side opposite to the stopper with respect to the stacked sheet media interposed therebetween, and movable in an up-down direction by pivoting about a given rotation axis.

2. The image recording apparatus according to claim 1, wherein the rotation axis is provided at a back side of the flap in an insertion direction of the feed tray, the housing includes a fixed structure member configured to pivotably support the flap, and the image recording apparatus further comprises:

a feed roller configured to feed the sheet medium from the feed tray to the conveyance path;

a swing arm configured to rotatably support the feed roller at an end portion of the swing arm at a back side of the swing arm in the insertion direction and including a swing shaft at an end portion of the swing arm at a front side of the swing arm in the insertion direction; and an engagement mechanism configured to engage the flap and the swing arm with a concave-convex engagement structure at a front side of the flap along the insertion direction, and to move the flap up and down as the swing arm swings.

3. The image recording apparatus according to claim 2, wherein the feed tray further includes a second accommodating portion configured to accommodate a roll body in which the sheet medium is wound in a roll shape, the flap guides a roll medium, which is the sheet medium unwound from the roll body, to the conveyance path, and the image recording apparatus further comprises a cutting portion located downstream of the stopper in a conveyance direction along the conveyance path and upstream of the image recording portion in the conveyance direction and configured to cut the roll medium.

4. The image recording apparatus according to claim 3, wherein the fixed structure member is a chute member fixed to a frame that supports the cutting portion.

5. The image recording apparatus according to claim 3, wherein the stopper includes a preventing member configured to prevent the sheet medium from entering a cutting portion side when the sheet medium in the first accommodating portion advances along the conveyance path formed between the flap and the stopper.

6. The image recording apparatus according to claim 1, wherein when the flap is moved downward and the stopper is in the restriction state, an upper end portion of the flap and an upper end portion of the stopper overlap with each other in a side view seen from a direction orthogonal to the insertion direction.

7. The image recording apparatus according to claim 6, wherein the stopper includes a plurality of concavo-convex portions on an abutment surface against the sheet medium.

8. The image recording apparatus according to claim 7, wherein the abutment surface of the stopper includes a first area including the plurality of concavo-convex portions, and a second area located below the first area and not including the concavo-convex portions.

9. The image recording apparatus according to claim 1, further comprising:

a moving member configured to move toward the back side in the insertion direction as the feed tray is inserted into the housing;

a damper configured to slow down movement of the moving member toward the back side;

a detection portion configured to detect insertion of the feed tray into the housing based on an incident state of light; and a light blocking portion provided on the moving member and configured to block an incidence of the light on the detection portion when the moving member moves toward the back side, wherein the detection portion detects the insertion of the feed tray by blocking the incidence with the light blocking portion.

10. The image recording apparatus according to claim 9, wherein the moving member includes an engaging member that engages with the stopper so as to move to the back side in the insertion direction when the stopper moves from the restriction state to the retraction state and to move to a front side in the insertion direction when the stopper moves from the retraction state to the restriction state, the damper is a gear damper that meshes with a gear portion provided on the engaging member, the detection portion includes an emission port for emitting the light and an incidence port for receiving the light, and the light blocking portion is a protrusion that is provided at a portion of the engaging member at the back side and inserted between the emission port and the incidence port when the engaging member moves toward the back side to block the incidence of the light.

11. The image recording apparatus according to claim 1, wherein the portion of the housing is disposed at a back side of the housing in an insertion direction of the feed tray.

12. An image recording apparatus comprising:

a housing in which a conveyance path is formed;

a feed tray insertable into and removable from the housing, configured to accommodate sheet media, and including a first accommodating portion configured to accommodate the sheet media in a vertically stacked state;

an image recording portion configured to record an image on one of the sheet media in the conveyance path;

a guide member provided at a portion of the housing which faces an end portion of the feed tray inserted into the housing, and configured to guide one of the sheet media in the first accommodating portion to the conveyance path;

a stopper movable between a restriction state in which the sheet medium is prevented by the stopper from reaching a bank provided in the guide member and a retraction state in which the sheet medium is reachable to the guide member, when the feed tray is inserted into the housing; and a flap that is configured to positioned above an uppermost sheet medium of the sheet media stacked in the first accommodating portion so that the uppermost sheet medium is disposed between the flap and the stopper, and movable in an up-down direction by pivoting about a given rotation axis.

* * * * *